(12) United States Patent
Takaba et al.

(10) Patent No.: US 6,978,145 B2
(45) Date of Patent: Dec. 20, 2005

(54) MULTIMEDIA SIGNAL PROCESSING APPARATUS

(75) Inventors: Tadashi Takaba, Fukuoka (JP); Masanobu Shigyo, Fukuoka (JP); Yukimasa Takahira, Fukuoka (JP); Junji Satoh, Fukuoka (JP); Kusuo Yonezawa, Fukuoka (JP); Hidetoshi Kawakami, Fukuoka (JP); Koji Kawase, Fukuoka (JP); Hiroshi Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 900 days.

(21) Appl. No.: 09/801,548

(22) Filed: Mar. 8, 2001

(65) Prior Publication Data

US 2002/0028695 A1 Mar. 7, 2002

(30) Foreign Application Priority Data

Aug. 8, 2000 (JP) .............................. 2000-240253

(51) Int. Cl.⁷ .............................................. H04M 1/00
(52) U.S. Cl. .............................. 455/453.1; 455/552.1; 455/456.2
(58) Field of Search ......................... 455/553.1, 552.1, 455/418–419, 434, 435.2, 435.3, 440, 456.1, 455/456.2, 456.3, 456.5, 456.6, 414, 445, 455/426, 526, 565; 370/335–338, 342–347, 370/444, 426

(56) References Cited

U.S. PATENT DOCUMENTS

| | | | | |
|---|---|---|---|---|
| 5,555,444 A | * | 9/1996 | Diekelman et al. | ........ 455/12.1 |
| 5,974,328 A | * | 10/1999 | Lee et al. | ................ 455/456.3 |
| 6,023,606 A | * | 2/2000 | Monte et al. | .............. 455/13.1 |
| 6,119,006 A | * | 9/2000 | Shaffer et al. | .............. 455/440 |
| 6,223,042 B1 | * | 4/2001 | Raffel | ......................... 455/455 |
| 6,256,487 B1 | * | 7/2001 | Bruhn | ........................ 455/352 |
| 6,421,544 B1 | * | 7/2002 | Sawada | ...................... 455/565 |
| 6,603,755 B1 | * | 8/2003 | Parker | ........................ 370/342 |

* cited by examiner

Primary Examiner—Pablo N. Tran
(74) Attorney, Agent, or Firm—Katten Muchin Rosenman LLP

(57) ABSTRACT

A multimedia signal processing apparatus comprises communication service units having a plurality of types of signal processing modes corresponding to a plurality of types of communication service classifications, a communication service classification identifying unit for identifying, on the basis of signal processing request information on one call communicated from a higher-rank node, a communication service classification for that call, and a mode control unit for controlling a signal processing mode of the communication service unit to a mode suitable for the communication service classification identified in the communication service classification identifying unit. With this configuration, in the multimedia signal processing apparatus, the signal processing mode of the communication service unit is controlled to a mode suitable for the service classification for each call, which can considerably decrease the number of communication service units to be mounted and significantly reduce the probability of the rejection of newly arrived call.

9 Claims, 24 Drawing Sheets

FIG. 6

| SPU LOGICAL NUMBER | EXTERNAL DESIGNATION ATTRIBUTE | SPECIFIED TIME | | | | | | | | | | | | | | | | | | | | | | | |
|---|---|---|---|---|---|---|---|---|---|---|---|---|---|---|---|---|---|---|---|---|---|---|---|---|
| | | 1 0:00~1:00 | 2 1:00~2:00 | 3 2:00~3:00 | 4 3:00~4:00 | 5 4:00~5:00 | 6 5:00~6:00 | 7 6:00~7:00 | 8 7:00~8:00 | 9 8:00~9:00 | 10 9:00~10:00 | 11 10:00~11:00 | 12 11:00~12:00 | 13 12:00~13:00 | 14 13:00~14:00 | 15 14:00~15:00 | 16 15:00~16:00 | 17 16:00~17:00 | 18 17:00~18:00 | 19 18:00~19:00 | 20 19:00~20:00 | 21 20:00~21:00 | 22 21:00~22:00 | 23 22:00~23:00 | 24 23:00~0:00 |
| 1 | 1:VOICE | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 | 2:ISDN | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 |
| 3 | 3:PACKET | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| 4 | 4:PIAFS | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 5 | 5:FAX | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 |
| 6 | 6:MODEM | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 |
| 7 | 7:PPP | 7 | 7 | 7 | 7 | 7 | 7 | 7 | 0 | 1 | 1 | 1 | 1 | 1 | 1 | 1 | 1 | 1 | 1 | 1 | 1 | 1 | 1 | 1 | 1 |
| 8 | 0:NO DESIGNATION | 1 | 0 | 0 | 0 | 0 | 0 | 0 | 0 | 1 | 1 | 1 | 1 | 0 | 1 | 1 | 1 | 1 | 1 | 1 | 1 | 0 | 0 | 0 | 0 |
| 9 | 0:NO DESIGNATION | 0 | 0 | 0 | 0 | 0 | 0 | 0 | 0 | 1 | 1 | 1 | 1 | 0 | 1 | 1 | 1 | 1 | 1 | 0 | 0 | 0 | 0 | 0 | 0 |
| 10 | 0:NO DESIGNATION | 0 | 0 | 0 | 0 | 0 | 0 | 0 | 0 | 1 | 1 | 1 | 1 | 0 | 1 | 1 | 1 | 1 | 1 | 0 | 0 | 0 | 0 | 0 | 0 |
| 11 | 0:NO DESIGNATION | 0 | 0 | 0 | 0 | 0 | 0 | 0 | 0 | 2 | 2 | 2 | 2 | 2 | 2 | 2 | 2 | 2 | 2 | 2 | 2 | 2 | 2 | 2 | 2 |
| 12 | 0:NO DESIGNATION | 0 | 0 | 0 | 0 | 0 | 0 | 0 | 0 | 2 | 2 | 2 | 2 | 2 | 2 | 2 | 2 | 2 | 2 | 2 | 0 | 0 | 0 | 0 | 0 |
| 13 | 0:NO DESIGNATION | 2 | 0 | 0 | 0 | 0 | 0 | 0 | 0 | 2 | 2 | 2 | 2 | 0 | 2 | 2 | 2 | 2 | 2 | 0 | 0 | 0 | 0 | 0 | 2 |
| 14 | 0:NO DESIGNATION | 0 | 0 | 0 | 0 | 0 | 0 | 0 | 0 | 2 | 2 | 2 | 2 | 0 | 2 | 2 | 2 | 2 | 2 | 0 | 0 | 0 | 0 | 0 | 0 |
| 15 | 0:NO DESIGNATION | 0 | 0 | 0 | 0 | 0 | 0 | 0 | 0 | 0 | 0 | 0 | 0 | 0 | 0 | 0 | 0 | 2 | 0 | 0 | 0 | 0 | 0 | 0 | 0 |
| 16 | 0:NO DESIGNATION | 0 | 0 | 0 | 0 | 0 | 0 | 0 | 0 | 3 | 3 | 3 | 3 | 3 | 3 | 3 | 3 | 3 | 3 | 3 | 3 | 3 | 3 | 3 | 3 |
| 17 | 0:NO DESIGNATION | 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 | 0:NO DESIGNATION | 0 | 0 | 0 | 0 | 0 | 0 | 0 | 0 | 0 | 1 | 1 | 1 | 0 | 1 | 1 | 1 | 1 | 0 | 0 | 0 | 0 | 0 | 0 | 0 |
| 19 | 0:NO DESIGNATION | 0 | 0 | 0 | 0 | 0 | 0 | 0 | 0 | 0 | 1 | 1 | 1 | 0 | 1 | 0 | 0 | 0 | 0 | 0 | 0 | 0 | 0 | 0 | 0 |
| 20 | 0:NO DESIGNATION | 0 | 0 | 0 | 0 | 0 | 0 | 0 | 0 | 0 | 0 | 2 | 2 | 0 | 2 | 0 | 0 | 0 | 0 | 0 | 0 | 0 | 0 | 0 | 0 |
| 21 | 0:NO DESIGNATION | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 22 | 0:NO DESIGNATION | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 23 | 0:NO DESIGNATION | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 24 | 0:NO DESIGNATION | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 25 | 0:NO DESIGNATION | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 26 | 0:NO DESIGNATION | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 27 | 0:NO DESIGNATION | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 28 | 0:NO DESIGNATION | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 29 | 0:NO DESIGNATION | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 30 | 0:NO DESIGNATION | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 31 | SPARE PKG | | | | | | | | | | | | | | | | | | | | | | | | |
| 32 | SPARE PKG | | | | | | | | | | | | | | | | | | | | | | | | |

EXTERNAL DESIGNATION ATTRIBUTE SET PREVIOUSLY
EXAMPLE (PREVIOUS DESIGNATION IS KEPT TO A MINIMUM, AND OTHER DESIGNATION IS HANDLED IN REAL TIME IN OPERATION)

| SPU LOGICAL NUMBER | EXTERNAL DESIGNATION ATTRIBUTE |
|---|---|
| 1 | 1:VOICE |
| 2 | 2:ISDN |
| 3 | 3:PACKET |
| 4 | 4:PIAFS |
| 5 | 5:FAX |
| 6 | 6:MODEM |
| 7 | 7:PPP |
| 8 | 0:NO DESIGNATION |
| 9 | 0:NO DESIGNATION |
| 10 | 0:NO DESIGNATION |
| 11 | 0:NO DESIGNATION |
| 12 | 0:NO DESIGNATION |
| 13 | 0:NO DESIGNATION |
| 14 | 0:NO DESIGNATION |
| 15 | 0:NO DESIGNATION |
| 16 | 0:NO DESIGNATION |
| 17 | 0:NO DESIGNATION |
| 18 | 0:NO DESIGNATION |
| 19 | 0:NO DESIGNATION |
| 20 | 0:NO DESIGNATION |
| 21 | 0:NO DESIGNATION |
| 22 | 0:NO DESIGNATION |
| 23 | 0:NO DESIGNATION |
| 24 | 0:NO DESIGNATION |
| 25 | 0:NO DESIGNATION |
| 26 | 0:NO DESIGNATION |
| 27 | 0:NO DESIGNATION |
| 28 | 0:NO DESIGNATION |
| 29 | 0:NO DESIGNATION |
| 30 | 0:NO DESIGNATION |
| 31 | SPARE PKG |
| 32 | SPARE PKG |

FIG. 22B

EXTERNAL DESIGNATION ATTRIBUTE SET PREVIOUSLY
EXAMPLE (RATIO OF SERVICES PREDICATABLE PREVIOUSLY IS RESERVED)

| SPU LOGICAL NUMBER | EXTERNAL DESIGNATION ATTRIBUTE |
|---|---|
| 1 | 1:VOICE |
| 2 | 1:VOICE |
| 3 | 1:VOICE |
| 4 | 1:VOICE |
| 5 | 1:VOICE |
| 6 | 2:ISDN |
| 7 | 2:ISDN |
| 8 | 2:ISDN |
| 9 | 2:ISDN |
| 10 | 2:ISDN |
| 11 | 3:PACKET |
| 12 | 3:PACKET |
| 13 | 3:PACKET |
| 14 | 3:PACKET |
| 15 | 3:PACKET |
| 16 | 4:PIAFS |
| 17 | 4:PIAFS |
| 18 | 5:FAX |
| 19 | 5:FAX |
| 20 | 6:MODEM |
| 21 | 6:MODEM |
| 22 | 7:PPP |
| 23 | 7:PPP |
| 24 | 0:NO DESIGNATION |
| 25 | 0:NO DESIGNATION |
| 26 | 0:NO DESIGNATION |
| 27 | 0:NO DESIGNATION |
| 28 | 0:NO DESIGNATION |
| 29 | 0:NO DESIGNATION |
| 30 | 0:NO DESIGNATION |
| 31 | SPARE PKG |
| 32 | SPARE PKG |

MULTIMEDIA SIGNAL PROCESSING APPARATUS

BACKGROUND OF THE INVENTION (1) Field of the Invention

The present invention relates to a multimedia signal processing apparatus (equipment) suitable for use in an apparatus, such as a switching apparatus (exchange) to be connected to a node (higher-rank node) constituting a common public switched network or mobile (radio) communications network, which is required to conduct needed signal processing with respect to signals (multimedia signals) to be interchanged with a higher-rank node according to classification (type) of communication service.

(2) Description of the Related Art

FIG. 23 is an illustrative view showing one example of the existing public switched network. In the usual way, as FIG. 23 shows, a public switched network (which will hereinafter be referred to simply as a "public network"), designated generally at reference numeral 100, has been constructed basically in the form of a hierarchical structure called "tree network", because of the economic impracticality of accommodating each of the nationwide subscriber terminals (telephones, personal computers, facsimiles, and other equipment) in a switching apparatus (switching exchange; node) installed in its neighboring area for connecting the switching exchanges of the respective areas entirely into a mesh-like configuration.

That is, taking Japan for instance, the whole of Japan is divided into some large areas (regional center areas; RAs) 101 each for installation of one regional center (RC) 110, with each of the regional center areas 101 being further divided into district center areas (DAs) 102 each for installation of one district center (DC) (sectional centers) 120, and even each of the district center areas 102 is additionally divided into toll center areas (TAs) 103 each for installation of one toll center (TC) (primary center) 130, with each of the toll center areas 103 being still additionally divided into terminal station areas 104 each for installation of one end office (EO) 140.

In addition, exchanges (centers, offices) pertaining to a lower-rank hierarchy are connected to an exchange pertaining to a higher-rank hierarchy to set up a star network (for example, the end offices 140 are accommodated in the toll center 130, and the toll centers 130 are accommodated in the district center 120, and further the district centers 120 are accommodated in the regional center 110), with the regional centers 110 being connected through basic circuits to each other, thus establishing the public network 100.

With such a configuration, in the existing public network 100, for example, in the case of long-distance toll call such as between Tokyo and Osaka, the calls starting from the end offices 140 are collected stepwise in the order of the toll centers 130, the district centers 120 and the regional centers 110 to be transmitted to the regional centers 110 accommodating the target end offices (call destinations) 140. That is, call collection and delivery is made along the "tree network", which enables efficient call transmission.

Meanwhile, for example, as service requests (signal processing requests) such as a request for call connection to a switching apparatus connected to a higher-rank hierarchy exchange (higher-rank node), there have been known a plurality of types of service classifications corresponding to various communication service modes, such as voice communications, packet communications, data communications using ISDN (Integrated Services Digital Network) and facsimile (FAX) communications, with the service classifications being not settled according to call. Incidentally, the "service classification" signifies the classification of a communication protocol peculiar to a communication service.

Furthermore, in a case in which there is a need for a switching apparatus to handle signals (multimedia signals) pertaining to these various service classifications, since this switching apparatus is required to function additionally as a system (multimedia signal processing apparatus) capable of dealing with multimedia signals, for example as shown in FIG. 24, packages (PKG) 200 each dedicated to a service classification, whose quantity is set to handle the maximum traffic (the maximum number of calls) estimated according to service classification, are mounted at every service classification (expressed by #A, #B, #C, and others) so that, in response to each service request from a higher-rank node 400, the package 200 corresponding to that service classification is selected to conduct the processing of a call (signal processing) with respect to the service request.

For example, when the higher-rank node 400 issues a service request for the service classification #A, the switching apparatus makes a decision/determination to the call service classification on the basis of information included in the received service request through the use of a service determining section 302 under control of a call control section 301 in a main control section 300, and further selects an idle package 200 of the packages 200 for the service classification #A as, for example, so-called incoming trunk/outgoing trunk on the basis of package mounted state management data 330 under management of a package mounted state managing section 303 and conducts the call processing.

Likewise, in response to a service request for another service classification #B or #C, the idle package 200 corresponding to the service classification #B or #C is seized or captured for conducting the call processing.

However, in the case of the above-mentioned arrangement, since the package 200 corresponding to a service request from the higher-rank node 400 is fixed according to service classification, a need for previous mounting of packages 200 capable of dealing with the estimated maximum traffic exists, which increases the scale of the switching apparatus. In addition to this problem, in a case in which calls exceed the maximum traffic (overload traffic), the foregoing configuration and processing leads to call loss (generation of rejection of newly arrived call).

SUMMARY OF THE INVENTION

Accordingly, the present invention has been developed in consideration of these problems, and it is therefore an object of the present invention to provide a multimedia signal processing apparatus capable of changing, according to call, a signal processing mode of a package (communication service unit) to a mode suitable for a service classification for that call, thus considerably decreasing the number of packages to be mounted and significantly reducing the probability of the call loss.

For this purpose, in accordance with the present invention, there is provided a multimedia signal processing apparatus comprising a communication service unit having a plurality of types of signal processing modes (which will hereinafter be referred to simply as "modes") corresponding to a plurality of types of communication service classifications, communication service classification identifying means for identifying (discriminating), on the basis of a request for signal processing on one call communicated from a higher-rank node, a communication service classification for that call, and mode control means for controlling a signal processing mode of the communication service unit to a mode suitable for the communication service classification identified in the communication service classification identifying means.

In the multimedia signal processing apparatus constructed thus according to the present invention, the signal processing mode of the communication service unit is controlled to a mode suitable for the service classification for a call, which eliminates the need for previously mounting communication service units capable of dealing with the maximum traffic. In addition, even if the deficiency of communication service units occurs with respect to one service classification traffic, it is possible to make up for the lack in such a manner that a mode of another communication service unit being in operation in a mode suitable for another service classification is changed to the mode corresponding to the service classification being in short supply.

Accordingly, the following advantages (1) to (4) are obtainable.

(1) As compared with a case in which dedicated communication service units are mounted according to service classification, that is, a case in which the number of communication service units to be allocated is fixed according to service classification, the number of communication service units needed to be mounted is considerably reducible so that remarkable size reduction of this system is achievable.

(2) There is no need for the manufacturer of this system to produce dedicated communication service units at every service classification, which enables shift from many-type production and maintenance to few-type production and maintenance, thus reducing the cost and improving maintenance quality.

(3) Since the communication service unit does not depend on the service classification, as compared with a case in which a dedicated communication service unit is mounted according to service classification, the allowable traffic quantity can increase and the probability of the call loss is suppressible to a low value. In consequence, the connectivity is improvable significantly to users.

(4) The calculation of the number of communication service units to be mounted at the production of this system can depend only upon an estimate of traffic quantity, which can eliminate the need for the ordinary analysis of a traffic quantity on a request from a peripheral higher-rank node at every service classification. In addition, even if the system is put in operation, this eliminates the need for the maintenance according to service, and requires simply coping with the excess and deficiency of the communication service units at the peak traffic.

Furthermore, it is also appropriate that the mode control means comprises with external indication type mode control section for controlling a signal processing mode of the communication service unit in accordance with a mode setting instruction from an external device. The employment of this configuration allows proper setting and change of the mode of the communication service unit from an external device.

Still furthermore, it is also appropriate that the mode control means includes history (temporal) information managing section for managing history information on mode control implemented in the past and prediction type mode control section for predictively controlling a signal processing mode of the communication service unit on the basis of the history information. The employment of this arrangement enables the prediction of a traffic tendency at one time on the basis of the history on the past control of the mode of the communication service unit for implementing the mode control in accordance with the prediction. This additionally contribute greatly to the decrease in the number of communication service units to be mounted and the reduction in the probability of the call loss.

In this case, the aforesaid prediction type mode control section can include time factor mode controller for controlling a mode of the communication service unit to a mode corresponding to mode setting information at a specified time on the basis of time information based on the history information and the mode setting information. With this configuration, for example, in the case of being beforehand familiar with the fact that the traffic on a specific service classification increases at one specific time zone, a mode of a communication service unit can be set at a mode suitable for that service classification at that time zone.

Thus, it is possible to secure the communication service unit corresponding to a specific service classification at every time in advance, and further to achieve the reduction of the loss probability.

Moreover, it is also appropriate that the communication service unit includes storage section for storing a plurality of types of communication service control programs corresponding to a plurality of types of communication service classifications and mode selection control section for controlling its own signal processing mode by loading selectively with the corresponding communication service control program from the storage means in accordance with a signal processing mode control indication from the mode control means.

In this way, as compared with the case of the individual equipment of a plurality of types of communication service control circuits, a communication service unit capable of handling a plurality of types of communication service classifications is realizable in a minimum hardware scale. This enables further size reduction of the multimedia signal processing apparatus.

BRIEF DESCRIPTION OF THE DRAWINGS

FIG. 6 is an illustration of history information (statistic information) in this embodiment;

FIGS. 22A and 22B are illustrations useful for initial setting (SPU allocation ratio according to service classification) of the SPU;

DESCRIPTION OF THE PREFERRED EMBODIMENTS

An embodiment of the present invention will be described hereinbelow with reference to the drawings.

Figure 1:
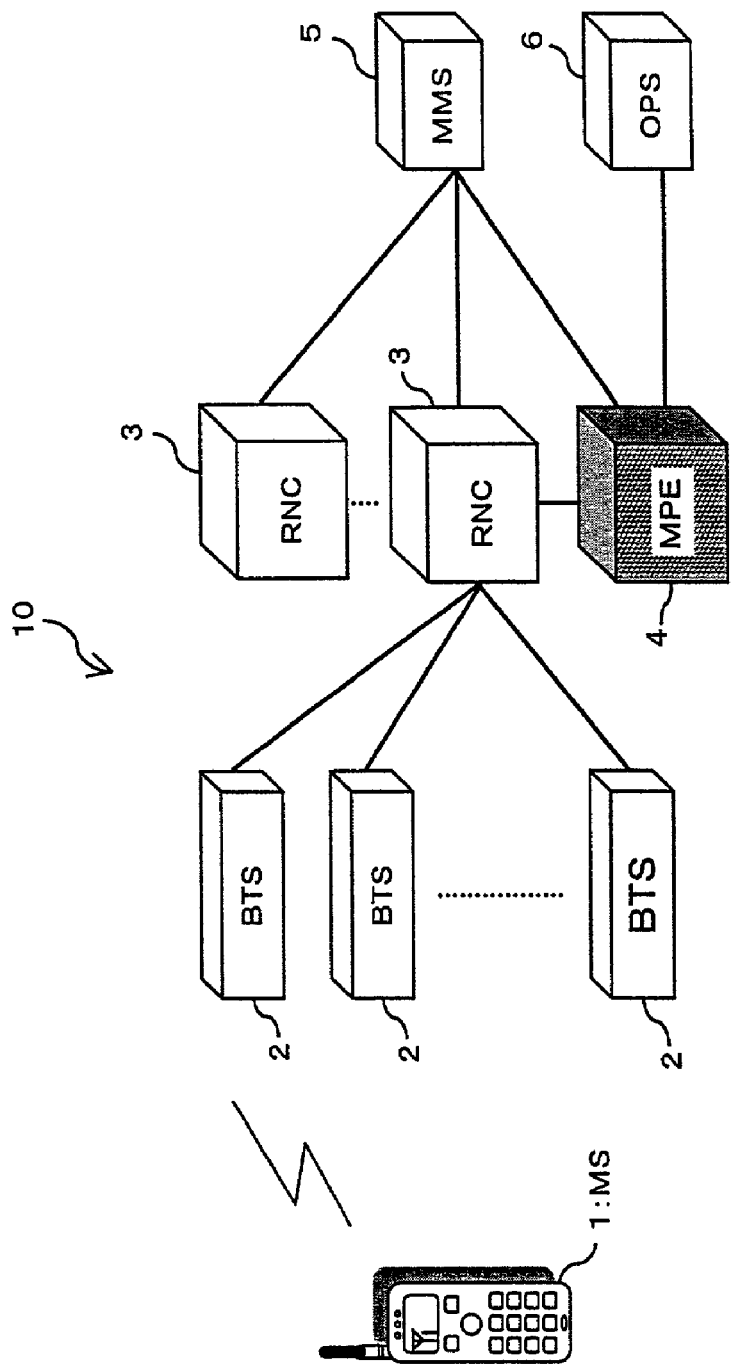
FIG. 1 is a block diagram showing a configuration of a mobile communications network according to an embodiment of the present invention.

FIG. 1 is a block diagram showing a configuration of a mobile communications network according to an embodiment of the present invention. In FIG. 1, a mobile communications network, designated generally at reference numeral 10, is made up of a mobile station (MS) 1, a plurality of base transceiver stations (BTSs) (radio base stations) 2, a plurality of radio network controllers (RNCs) 3, a piece of multimedia signal processing equipment (apparatus) (MPE) 4, a mobile multimedia switching system (MMS) 5, an operation system (OPS) 6, and other units.

In this configuration, the MS 1 is a portable information terminal including so-called portable telephones, PHS (Personal Handy-phone System) terminals, PDAs (Personal Digital Assistance) capable of setting up data communications through the use of these devices, notebook sized personal computers, and others. Incidentally, although only one MS 1 appears in FIG. 1, a plurality of MSs 1 can also be put to use.

Each of the BTSs 2 is for providing radio communications with the MS 1 within a radio communication range (MS existing zone which is called "cell"), it establishes, to accomplish interchange of calls (data) with respect to the MS 1 on the basis of various communication service classifications (protocol classifications). For example, the following various kinds of services are listed as the aforesaid communication service classification (which will hereinafter be referred to simply as a "service classification" or "protocol attribute"). That is:

(1) general voice communication services;

(2) packet communication services;

(3) communication services using ISDN;

(4) data communication services based upon PIAFS (PHS Internet Access Forum Standard) in the case of access to the Internet through a PHS;

(5) data communication services [TCP (Transmission Control Protocol)/IP (Internet Protocol) communications] based upon point-to-point protocol (PPP);

(6) facsimile (FAX) communication services; and (7) data communication services using modem.

In the following description, the aforesaid voice communication services, packet communication services, communication services using ISDN, data communication service based upon PIAFS, data communication services based upon PPP, FAX communication services and data communication services using modem are sometimes referred to simply as"voice", "packet", "ISDN", "PIAFS", "PPP", "FAX" and "modem", respectively.

Furthermore, each of the RNCs 3 accommodates a plurality of BTSs 2, and is for implementing various types of radio communication control, such as terminating a call delivered (switched) from the MMS 5 at the BTS 2 taking charge of the MS existing zone where the destination target MS 1 exists, or multiplexing calls from the BTSs 2 to transmit them to the MMS 5.

Figure 2:
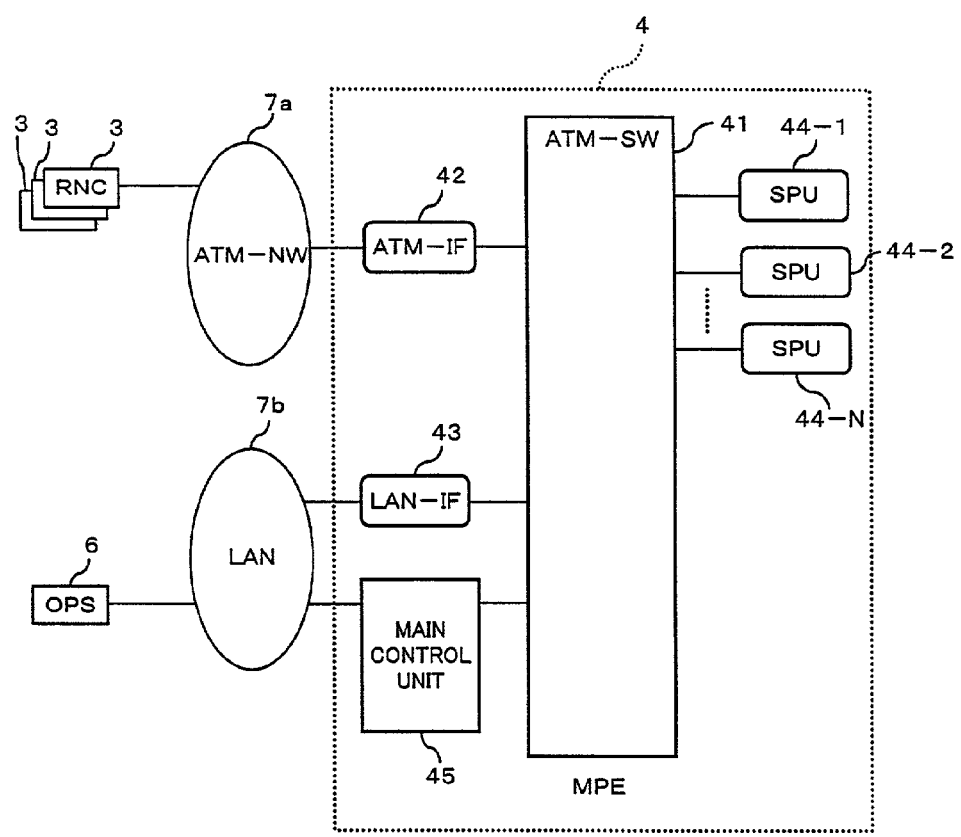
FIG. 2 is a block diagram showing a configuration of an ATM switching apparatus acting as a multimedia signal processing apparatus according to the embodiment of the present invention.

The aforesaid MPE 4 is connected to the RNCs 3 for conducting various types of signal processing for signals (data) received from the RNCs 3. For example, as FIG. 2 shows, in the case of accommodating the RNCs 3 through an ATM (Asynchronous Transfer Mode) network 7a, the MPE 4 is constructed as an ATM switching apparatus. The detailed arrangement thereof will be described later.

Figure 23:
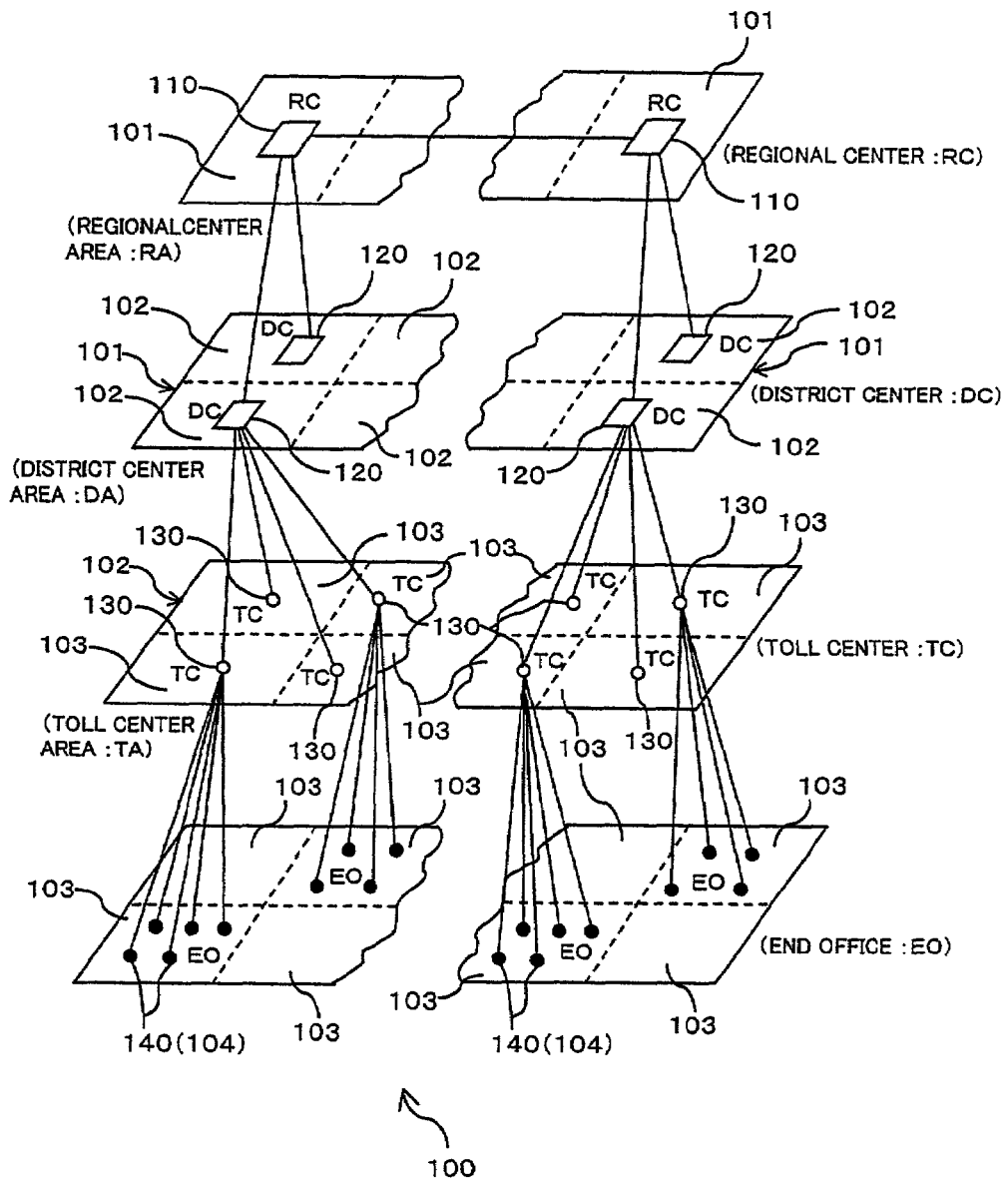
FIG. 23 is an illustrative view showing one example of the existing public switched network (tree network)
Figure 24:
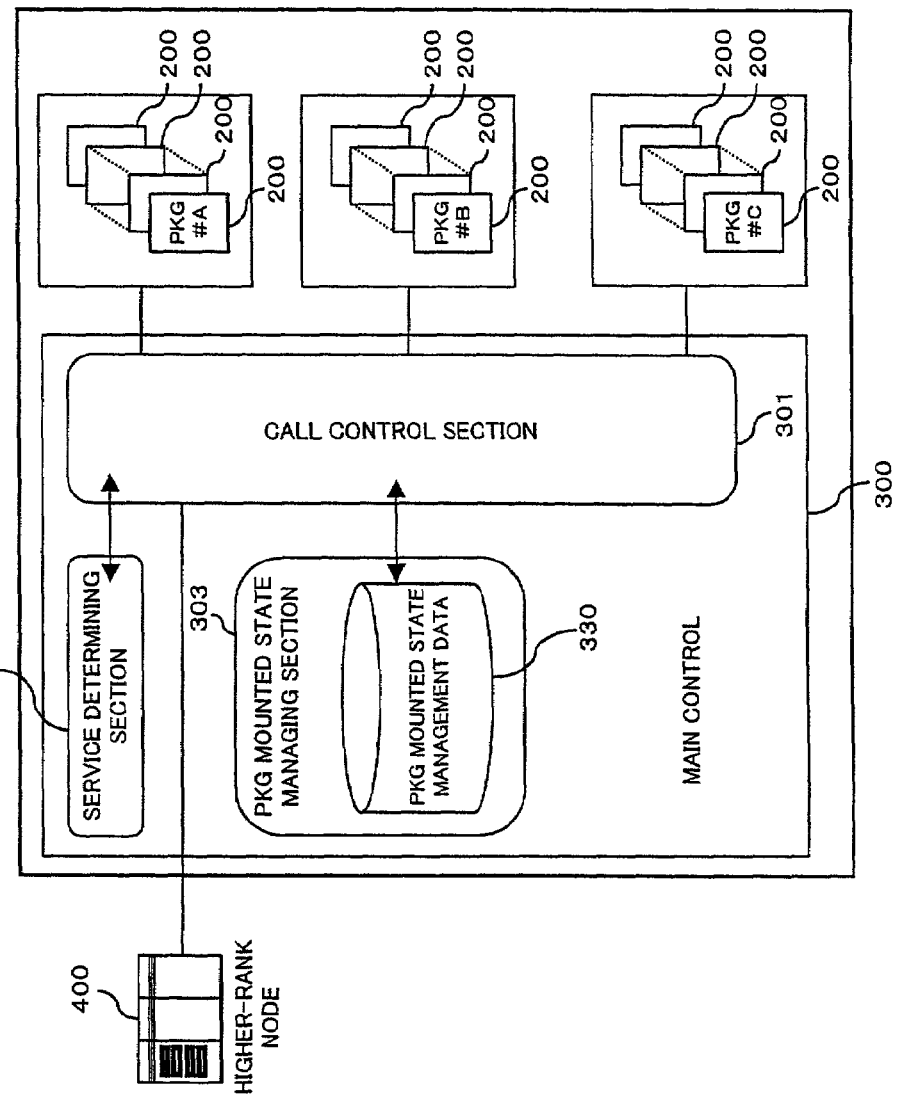
FIG. 24 is a block diagram showing one example of a multimedia signal processing apparatus (switching apparatus).

The MMS 5 is connected through a gateway station (not shown) to a toll center 130, a district center 120, a regional center or the like, described above with reference to FIG. 23, to be connected to a public network 100 for conducting call switching processing between the public network 100 and the RNC 3 or the MPE 4. That is, this MMS 5 serves as a higher-rank node for making a service request (signal processing request) such as call connection/release with respect to the MPE 4. Incidentally, the foregoing service request includes information for identifying call service classifications.

Figure 3:
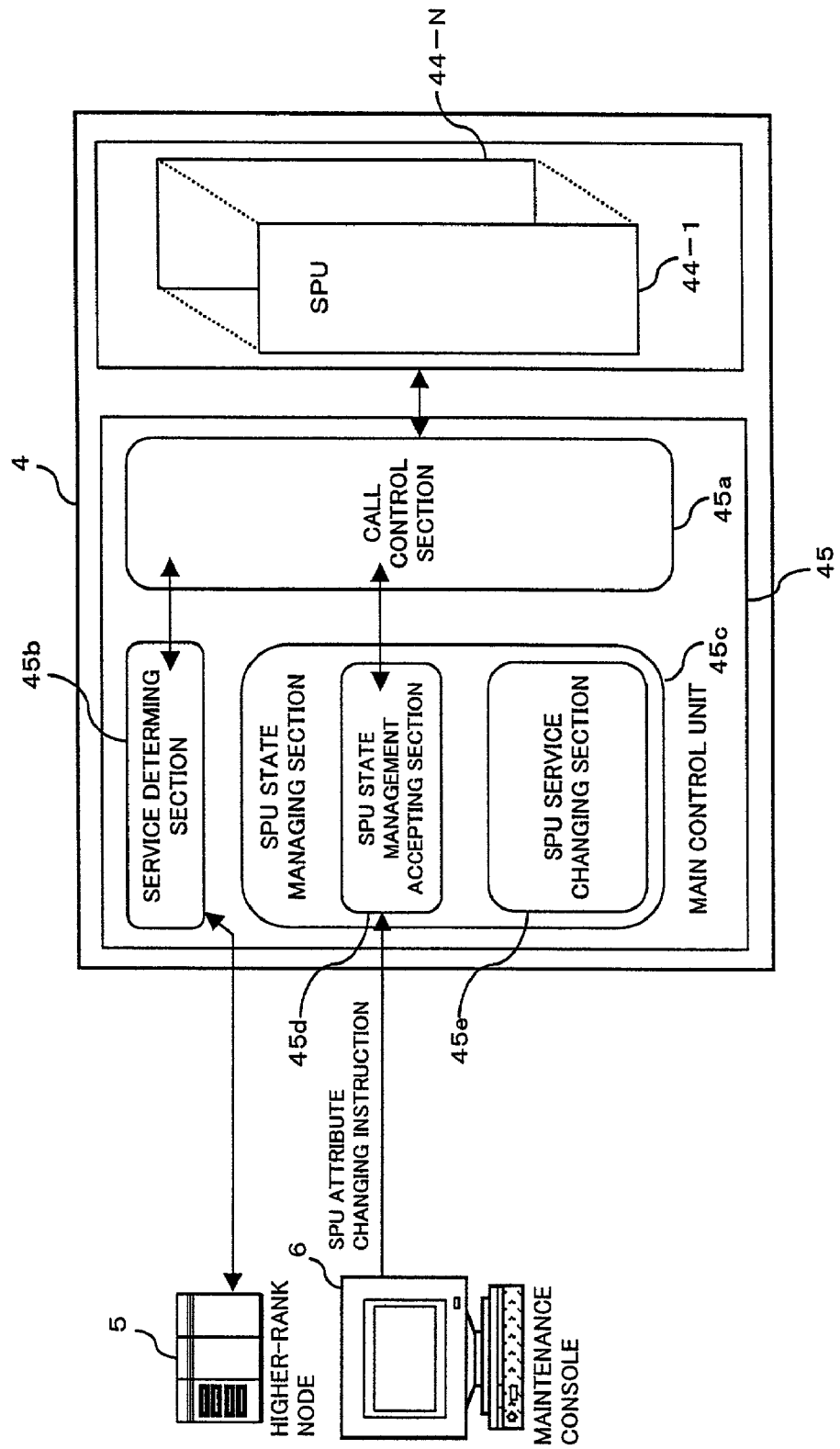
FIG. 3 is a block diagram showing a configuration of an essential part of the ATM switching apparatus shown in FIG. 2.

The OPS 6 is connected through a needed circuit network such as LAN (Local Area Network) 7b to the MPE 4 for providing the management of maintenance or operations of the MPE 4. For example, the OPS 6 is constructed as a maintenance console as shown in FIG. 3, with various operation setting of the MPE 4 being properly made through this maintenance console 6.

In addition, in the case of being constructed as an ATM switching apparatus as mentioned above, for example as shown in FIG. 2, the MPE 4 comprises an ATM switch (ATM-SW) 41, an ATM interface (ATM-IF) 42, an LAN interface (LAN-IF) 43, a plurality of service protocol units (SPU) 44-1 to 44-N (N is a natural number), a main control unit 45, and other units.

In this configuration, the ATM switch 41 is for switching calls, interchanged with the ATM network 7a or the LAN 7b, on an ATM cell basis. As well known, the setting of in-system path identification information (tag information) based upon destination information [VPI (Virtual Path Identifier)/VCI (Virtual Channel Identifier)] set in a header portion of a received ATM cell is provided from the main control section 42, thereby establishing a path connection corresponding to the destination information for transferring ATM cells (ATM communication).

The ATM interface 42 is for providing an interface with the ATM network 7a, while the LAN interface 43 is for providing an interface with the LAN 7b, and has a function to convert a signal from the LAN 7b into an ATM cell or to convert an ATM cell switched by the ATM switch 41 into a signal to the LAN 7b.

Each SPU (package) 44-i is for conducting protocol termination processing according to a service classification for a call, and in this embodiment, one SPU 44-i enables operations in attributes (signal processing modes) according to (suitable for) a plurality of types of service classifications mentioned above. The details thereof will be described later with reference to FIGS. 7 and 8.

The main control unit 45 is for generalizing the control of operations (connection establishment/release processing and others) of this ATM switching apparatus 4, and in this embodiment, has such basic functions as to manage, not to speak of the SPU 44-i (i=1 to N), the resources (including the ATM switch 41, bands, and others) in the interior of the ATM switching apparatus for capturing or releasing needed resources (including SPU 44-i) in accordance with a service request (signal processing request such as call connection request or call release request) from the higher-rank node 5 and further has functions to change the attribute (signal processing mode) of the SPU 44-i properly at every service request from the higher-rank node 5 or in accordance with an indication (external setting) from the maintenance console 6 for appropriately varying the number of allocations according to service classification of the SPU 44-i.

For this reason, this main control unit 45 includes, in its essential part, a call control section 45a, a service determining section 45b and an SPU state managing section 45c, for example as shown in FIG. 3. Incidentally, in FIG. 3, the aforesaid ATM switch 41, ATM interface 42, LAN interface 43 and others shown in FIG. 2 are omitted from illustration.

The call control section 45a is for controlling the above-mentioned connection establishment/release (allocation/release of resources) processing and others mainly, and the service determining section (communication service classification identifying means) 45b is for discriminating (identifying) a service classification for a call, to be processed, on the basis of service classification identifying information included in a service request communicated from the higher-rank node 5, with the identification result being sent through the call control section 45a to the SPU state managing section 45c in the form of an allocation request (which will be referred to hereinafter as an SPU allocation request) of an SPU 44-i needed (corresponding in requested service protocol attribute) for the signal processing of that call.

The SPU state managing section (mode control means) 45c has functions to manage the number of SPUs 44-i mounted and the operating state (idle condition, attribute) of each SPU 44-i and others and further to control (change) the attribute (signal processing mode) of the SPU 44-i to an attribute suitable for a requested service classification in accordance with an indication (SPU attribute changing instruction) from the maintenance console 6 or the aforesaid SPU allocation request from the call control section 45a in cooperation with the call control section 45a. For these functions, for example, the SPU state managing section 45c includes an SPU state management accepting section 45d and an SPU service changing section 45e.

Figure 5A:
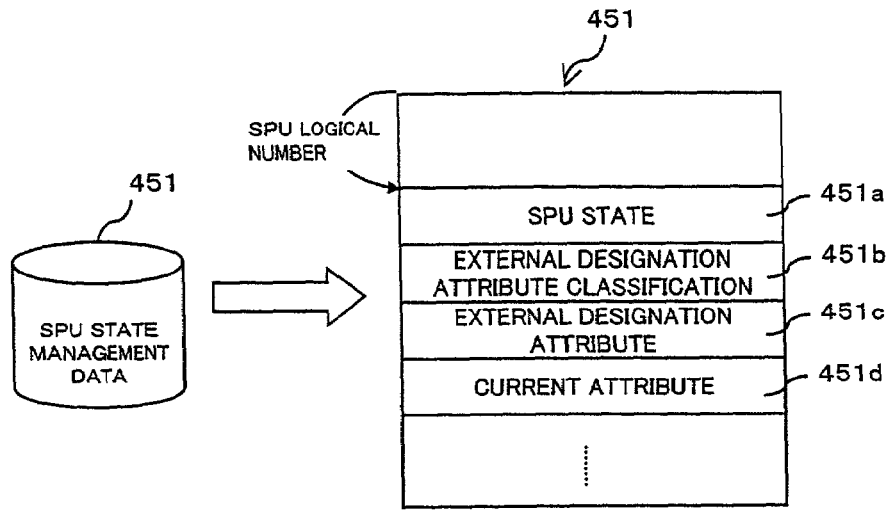
FIG. 5A is an illustration of one example of SPU state management data in this embodiment.

That is, for example, as FIG. 5A shows, the SPU state management accepting section 45d manages an operating condition of each SPU 44-i by managing SPU state management data 451 including the following data (1) to (4) on each logical number (which will be referred to hereinafter as an "SPU logical number") allocated to each SPU 44-i.

(1) SPU state data 451a: data representative of idle state/active state of the SPU 44-i For example, the "idle" state is expressed by "0" while the active (occupied) state is expressed by "1".

Although one SPU 44-i generally has ability to process calls corresponding to a plurality of channels, in this embodiment, for convenience of description only, let it be assumed that one SPU 44-i handles call for one channel, and the "idle state" of the SPU 44-i signifies a standby state in which the call processing is not conducted.

(2) External designation attribute classification data 451b: data representative of whether or not the SPU 44-i deals with time specified by time handling attribute management data 542 which will be described hereinbelow with reference to FIG. 5B For example, "time handling" is expressed by "0" while "time non-handling" is indicated by other than that value.

(3) External designation (Externally Specified) attribute data 451c: data indicative of an attribute (service classification) of the SPU 44-i specified as a default attribute (priority attribute) from the maintenance console 6

For example, the value "0" signifies "no designation", while the values other than"0" signify"presence of designation". As one example, "1" represents "voice handling", "2" denotes "ISDN handling", "3" depicts "packet handling", "4" designates "PIAFS handling", "5" indicates "FAX handling", "6" signifies "modem handling" and "7" stands for "PPP handling".

(4) Current Attribute data 451d: data indicative of the current attribute of the SPU 44-i As with the aforesaid external designation attribute data 451c, the value "0" signifies "no designation", "1" represents "voice handling", "2" denotes "ISDN handling", "3" depicts "packet handling", "4" designates "PIAFS handling", "5" indicates "FAX handling", "6" signifies "modem handling" and "7" stands for "PPP handling".

In a case in which the value of the current attribute data 451d is different from the value of the external designation attribute data 451c, as will be described later, the latter external designation attribute data 451c is prior thereto, while the former current attribute data 451d is updated to agree with the external designation attribute data 451c.

In addition, the data 451b to 451d other than the SPU state data 451a can be altered properly in a manner that an SPU attribute changing instruction (mode setting instruction) is given from the maintenance console 6 to the SPU state management accepting section 45d. Still additionally, the SPU state management data 451 is managed in a state stored in a storage device (not shown) such as a memory.

Furthermore, the SPU service changing section 45e is for, when a need for SPU attribute change exists, communicating an SPU attribute changing request through the call control section 45a to the corresponding (relevant) SPU 44-i on the basis of an indication (SPU attribute changing instruction) from the maintenance console 6 or an SPU allocation request [an identification result of a service classification (request protocol) in the service determining section 45b], with the corresponding SPU 44-i is put in operation in a state set as an SPU 44-i showing a requested attribute.

In addition, the implementation of this attribute changing instruction updates the SPU state management data 451 (current attribute data 451d) for the corresponding SPU 44-i.

That is, the SPU state management accepting section 45d and the SPU service changing section 45e also function as an external indication type mode control section to control the attribute (signal processing mode) of an SPU 44-i in accordance with an SPU attribute changing instruction (mode setting instruction) from the maintenance console 6 acting as an external unit (another control section).

Figure 4:
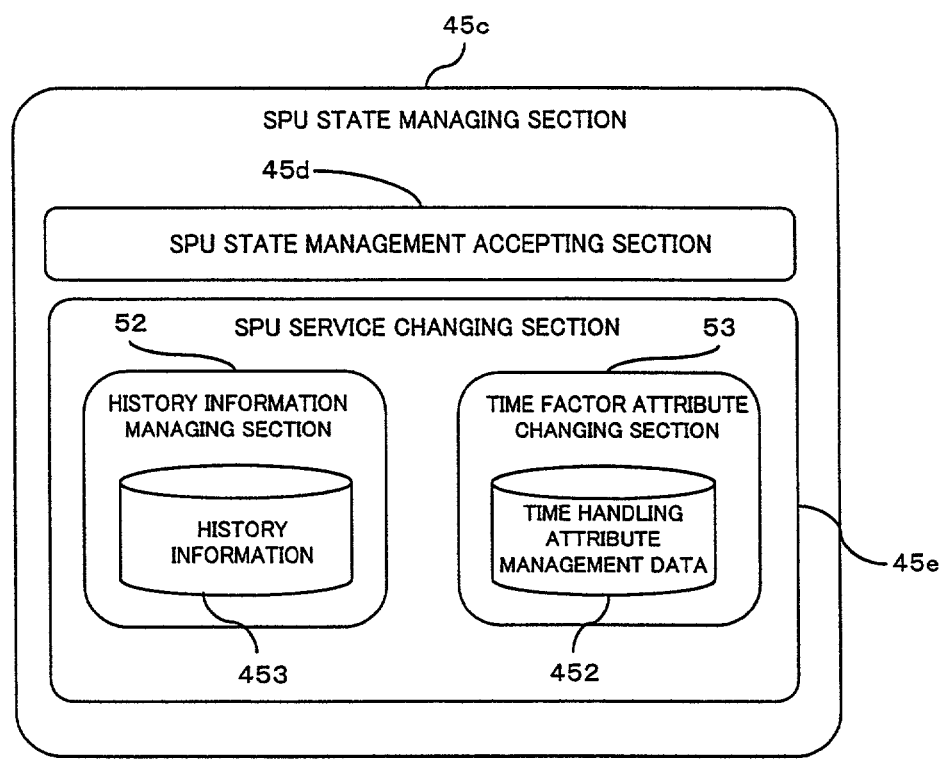
FIG. 4 is a block diagram showing a configuration of an SPU state managing section shown in FIG. 3.

In addition to the above-mentioned function, as FIG. 4 shows, the aforesaid SPU service changing section 45e also functions as a history information managing section 52 to manage which SPU 44-i has operated at what time and in what attribute, by collecting or recording statistical information (history information) 453 on the attribute changing instructions (mode control) to the SPUs 44-i in the past, for example, as shown in FIG. 6, that is, by collecting the updating history on the aforesaid current attribute data 451d.

The addition of this history information managing section 52 permits analyzing and understanding that calls tend to gather in what date, day of the week or time zone and in which service classification; therefore, in accordance with the analysis result, the SPU state changing section 45c can increase or decrease somewhat the number of SPU allocations at a specific time and for a specific service classification.

For example, in FIG. 6, in the case of common enterprises, since the voice or ISDN traffic may reduces relatively in the nonoccupational time, it is possible to set the voice handling (attribute="1") or ISDN handling (attribute="2") SPU allocations at a somewhat small value at that time zone. Conversely, it is possible to set the SPU allocations at a somewhat a larger value in advance in the time zone, such as at the start of business or at the end of a lunch break, in which the traffic tends to increase.

In the example shown in FIG. 6, the number (N) of SPUs 44-i mounted is 32 (logical number=1 to 32; where the SPUs 44-31 and 44-32 respectively corresponding to the logical numbers 31 and 32 are spare devices, and as will be described later with reference to FIG. 22A, the number of initial SPU 44-i allocations for each of the service classifications on "voice", "ISDN", "packet", "PIAFS", "FAX", "modem" and "PPP" is set at a minimum (one).

Figure 5B:
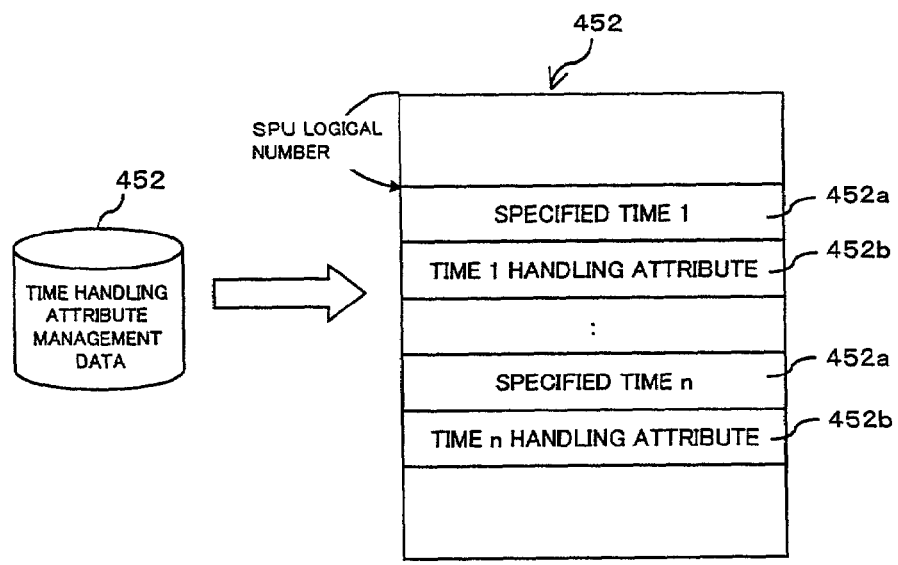
FIG. 5B is an illustration of one example of time corresponding attribute management data in this embodiment.

In addition, in this embodiment, as shown in FIG. 4, such setting according to a time factor is realized in a manner that the SPU service changing section 45e includes a time factor attribute changing section 53 which gives an attribute changing instruction to the corresponding SPU 44-i on the basis of time handling attribute management data 452, shown in FIG. 5B, to be managed according to the SPU 44-i.

That is, as FIG. 5B shows, the time factor attribute changing section 53 can manage a maximum of n (n : a natural number) sets of data (a set of specified time data 452a and a specified time handling attribute data 452b) representative of which attribute of the SPU 44-i is to be set at one specified time (time zone) as time handling attribute management data 452 according to SPU logical number, and then refer to this time handling attribute management data 452 at all times or periodically for automatically changing (setting) the attribute of the corresponding SPU 44-i to a specified attribute at a specified time.

To sum up, the history information managing section 52 and the time factor attribute changing section 53 function as a prediction type mode control section to predictively controlling the attribute of the SPU 44-i on the basis of the aforesaid history information 453, while the time factor attribute changing section 53 acts as a time factor mode control section to control the attribute of the SPU 44-i to a specified attribute at a specified time on the basis of the time handling attribute management data 452 based on the aforesaid history information 453.

The specified time handling attribute data 452b are set at a value defined as with the external designation attribute data 451c or the current attribute data 451d mentioned above with reference to FIG. 5A. That is, the value "0" represents "no designation", "1" depicts "voice handling", "2" denotes "ISDN handling", "3" designates "packet handling", "4" signifies "PIAFS", "5" indicates "FAX handling", "6" means "modem handling", and "7" stands for "PPP handling".

In addition, the aforesaid time handling attribute management data 452 or history information 453 is also managed in a state retained in a storage device such as a memory (not shown). Still additionally, the aforesaid specified time data 452a (time zone) can be prescribed with start time and end time or defined with start time and a duration there from. More over, it is also acceptable that the time factor attribute changing section 53 automatically makes up the aforesaid time handling attribute management data 452 on the basis of the aforesaid history information 453 (see FIG. 6), or that the aforesaid time handling attribute management data 452 is individually set through the maintenance console 6 as will be described later.

Secondly, a description will be given hereinbelow of a configuration of each of the SPUs 44-i.

Figure 7:
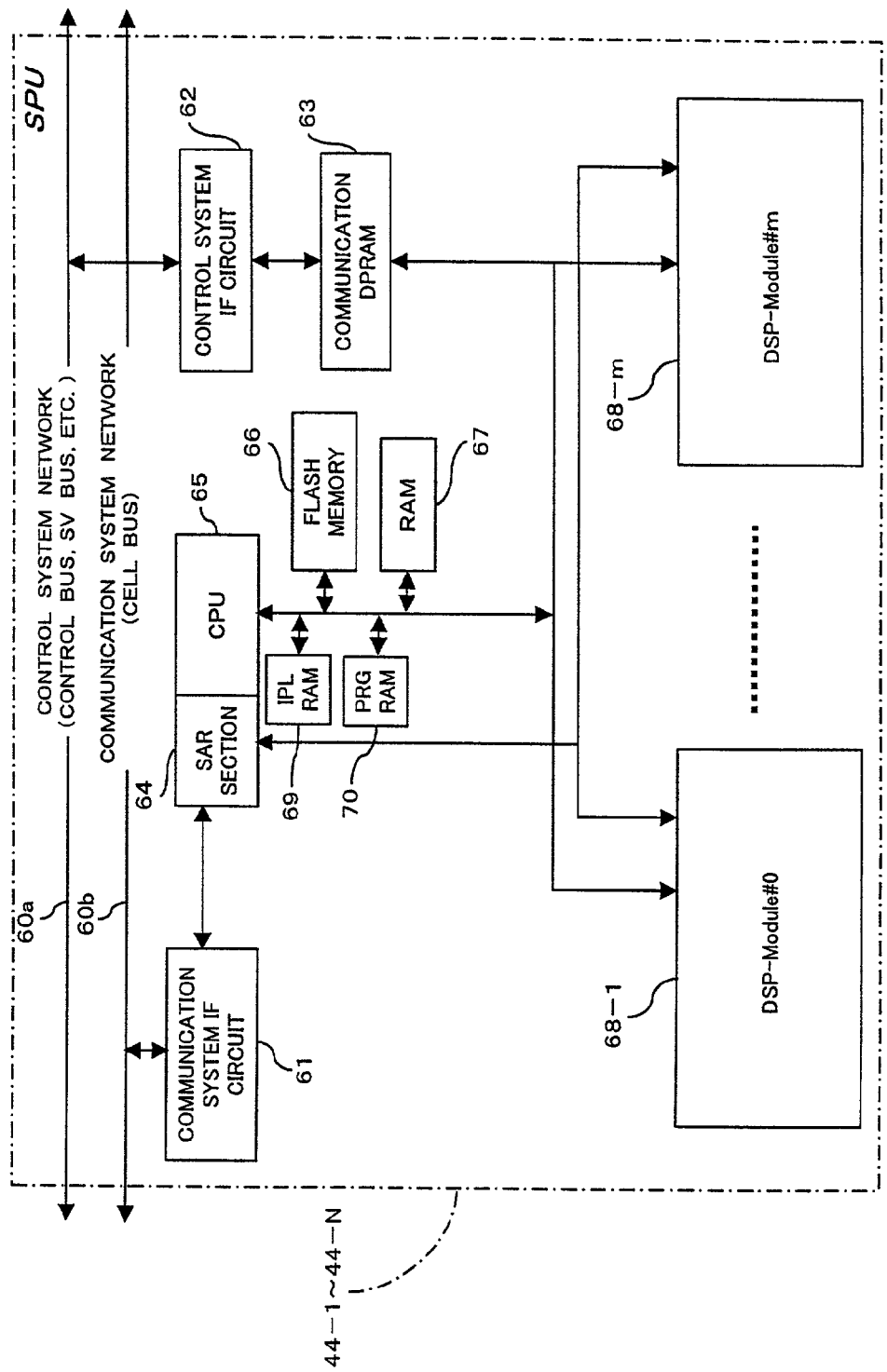
FIG. 7 is a block diagram showing a detailed example of a configuration of an SPU shown in FIGS. 2 and 3.

FIG. 7 is a block diagram showing a detailed configuration of each of the above-mentioned SPUs 44-i. As FIG. 7 shows, each of the SPUs 44-i is composed of a communication system interface (IF) circuit 61, a control system interface (IF) circuit 62, a communication dual port RAM (DPRAM) 63, a cell structure and restructure (SAR) section 64, a CPU 65, a flash memory 66, RAM 67, DSP (Digital Signal Processor) modules 68-1 to 68-m (m: natural number), an IPL (Initial Program Load) memory (RAM) 69, a program memory (RAM) 70, and other devices.

The communication system IF circuit 61 is for providing an interface with a communication system network (cell bus) 60b in which ATM cells flow, and the control system IF circuit 62 is for providing an interface with a control system network 60a comprising a control bus or a supervision (SV) bus, and further the communication DPRAM 63 is for storing a control message interchanged in the communication (via the control bus) with the control system network 60a through the control system IF circuit 62, with the control taking place in accordance with the control message in a manner that the CPU 65 has access to the communication DPRAM.

The SAR section 64 is for making ATM cell structure (header addition)/restructure (header removal), with only a data portion after the removal of a header from an ATM cell being interchanged between the SAR section 64 and each of the DSP modules 68-j (j=1 to m).

The CPU 65 operates in accordance with a CPU program (CPU firmware) retained in the program memory 70 for generally controlling the operations (multimedia signal processing) of the SPU 44-i, and each of the DSP modules 68-j is for conducting the signal processing (protocol conversion) on cell data (multimedia signal) received from the SAR section 6 in accordance with a DSP 68-j program (DSP firmware) retained in the RAM 67 and loaded in an internal memory (not shown).

Meanwhile, in this embodiment, pluralities of types of CPU firmware and DSP firmware, corresponding to service classifications, are previously stored as communication service control programs in different areas of the flash memory 66 according to service classification, and the firmware (storage area) are selected in accordance with an attribute changing instruction from the aforesaid SPU service changing section 45c and read into the RAM 67. Then, the CPU firmware and the DSP firmware needed are loaded in the CPU 65 and any one of the DSP modules 68-j, respectively, thereby conducting the signal processing corresponding to a plurality of types of service classifications in one SPU 44-i as stated above.

Figure 8:
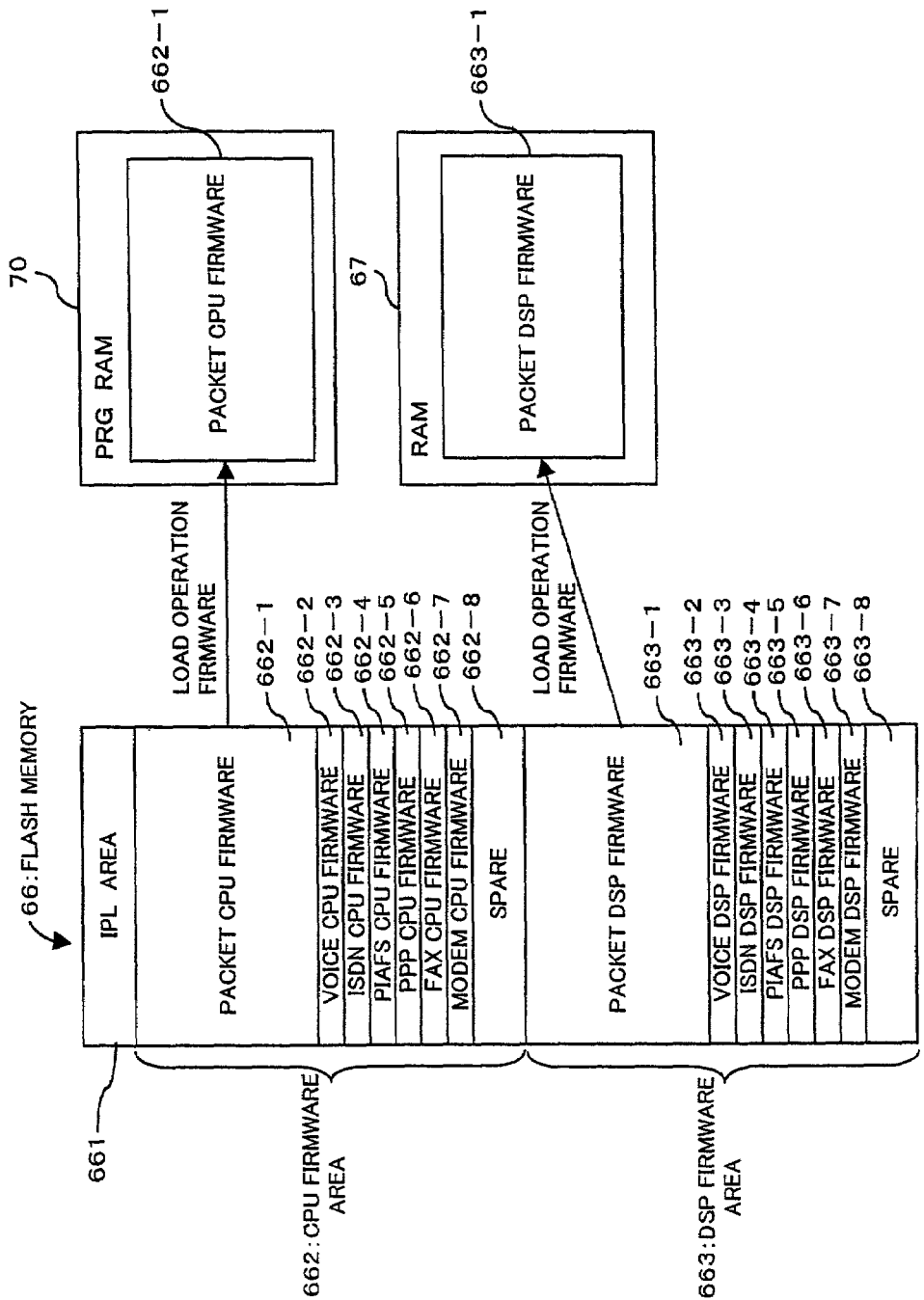
FIG. 8 is an illustration useful for explaining storage contents of a flash memory shown in FIG. 7 and a loading operation from the flash memory.

Concretely, for example, as FIG. 8 shows, the flash memory 66 is provided with at least an IPL area 661, a CPU firmware area 662, a DSP firmware area 663 and others. The CPU firmware area 662 retains service classification handling CPU firmware (programs) 662-1 to 662-7, such as packet (attribute="3"), voice (attribute="1"), ISDN (attribute="2"), PIAFS (attribute ="4") PPP (attribute="7") FAX (attribute="5" and modem (attribute="6"), and similarly, the DSP firmware area 663 retains service classification handling DSP firmware (programs) 663-1 to 663-7.

In addition, the aforesaid IPL area 661 retains an initialization program to be read initially by the CPU 65 (to be opened in the IPL memory 69) at the SPU start-up (power-on) or the like. Still additionally, each of the firmware areas 662 and 663 includes spare firmware areas 662-8 and 663-8 for coping with an increase in the number of service classifications the SPU 44-i deals with, respectively.

Furthermore, when an attribute changing instruction (for example, an instruction on attribute change to packet handling service) from the aforesaid SPU state managing section 45c (SPU service changing section 45e) is put through the control system network 60a in the communication DPRAM 63 to be retained as the aforesaid control message, the CPU 65 reads the CPU firmware 662-1 and the DSP firmware 663-1, handling a service classification (for packet in FIG. 8) specified by the afore said attribute changing instruction, as operation firmware into the program memory 70 and the RAM 67, respectively, so that the operation firmware are loaded in the CPU 65 itself and any one of the DSP modules 68-j.

That is, the aforesaid flash memory 66 functions as a storage section storing a plurality of types of communication service control programs corresponding to a plurality of types of communication service classifications, while the CPU 65 functions as an SPU attribute changing section (mode selection control section) to load selectively with the corresponding communication service program from the flash memory 66 in accordance with an attribute changing instruction from the aforesaid SPU state managing section 45c for controlling its own attribute (signal processing mode).

For this reason, the number (m) of the DSP modules 68-j to be mounted can be smaller than the number of service classifications; therefore, the non-used DSP modules 68-j are available as spare for the DSP modules 68-j which falls into disuse due to the occurrence of a trouble.

A detailed description will be given hereinbelow of an operation of the ATM switching apparatus (MPE) 4 according to this embodiment thus constructed.

(1) Description of SPU Attribute Setting Procedure (Time Factor/Non-Time Factor)

First, a description will be described hereinbelow of a procedure of setting (changing) an attribute of the SPU 44-i through the maintenance console 6.

Figure 9:
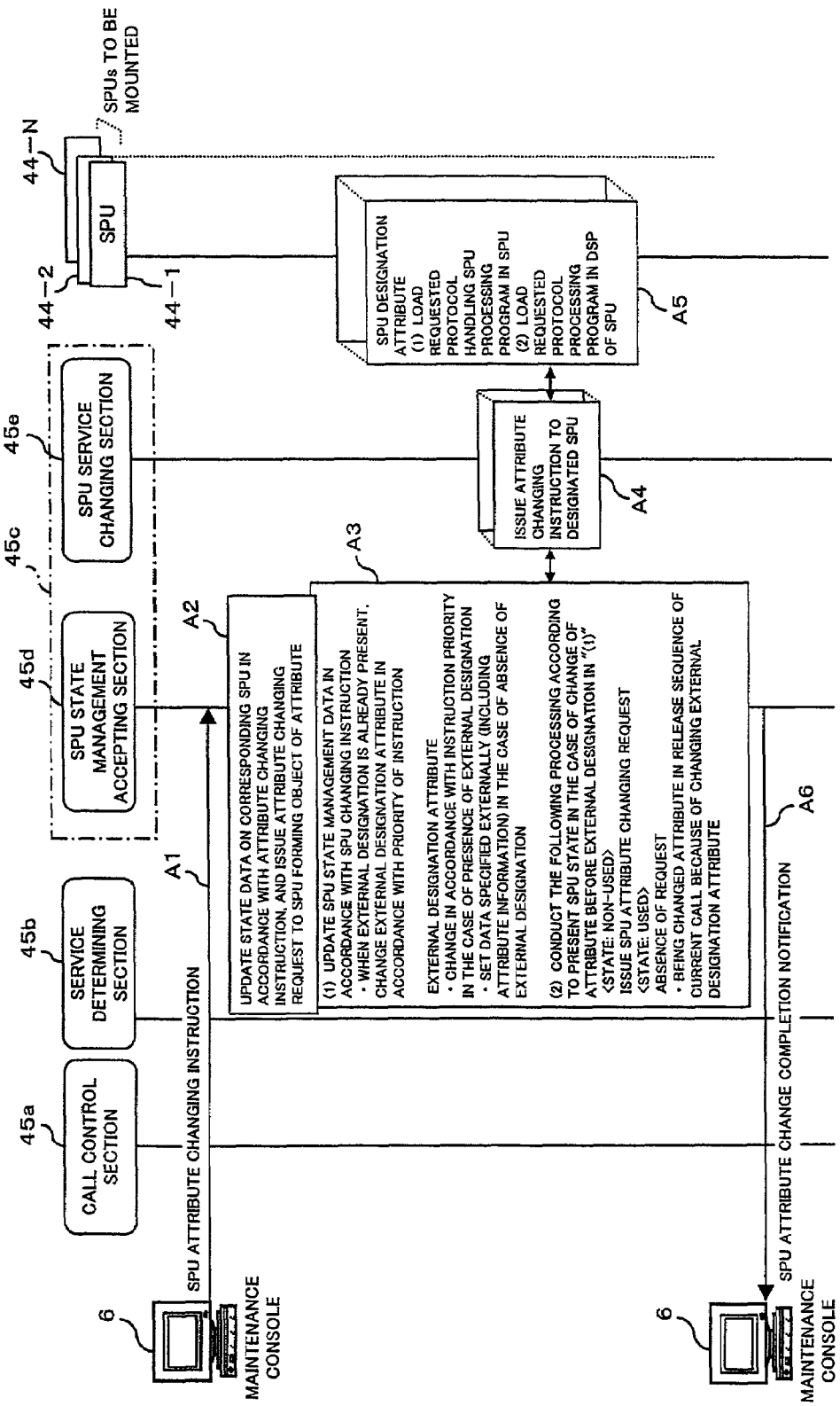
FIG. 9 is a sequence illustration useful for explaining an operation (SPU attribute alteration procedure) of the ATM Switching apparatus according to this embodiment.

For example, as FIG. 9 shows, an SPU attribute changing instruction (ID=1) for one SPU 44-i is introduced as a processing request from the maintenance console 6 (step A1), with this processing request (SPU attribute changing instruction) being accepted by the SPU state managing section 45c (SPU state management accepting section 45d).

As a result, the SPU state management accepting section 45d updates the SPU state management data 451 for the corresponding SPU 44-i in accordance with the received SPU attribute changing instruction, and issues, to the SPU service changing section 45e, an attribute changing request with respect to the SPU 44-i being the object of the attribute change (step A2).

Figure 14:
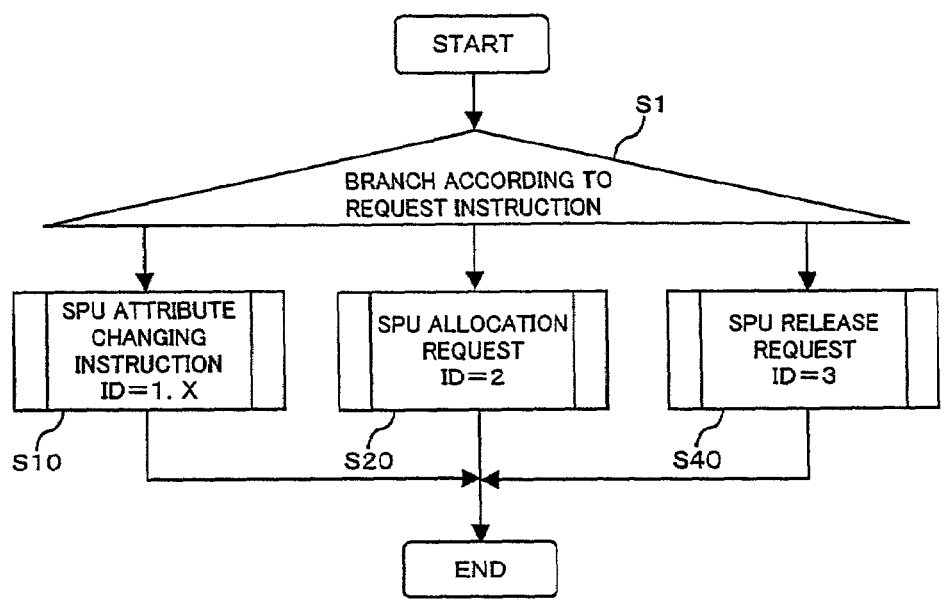
FIGS. 14 and 15 are flow charts useful for explaining an operation of an SPU state managing section shown in FIGS. 2 and 3.
Figure 16:
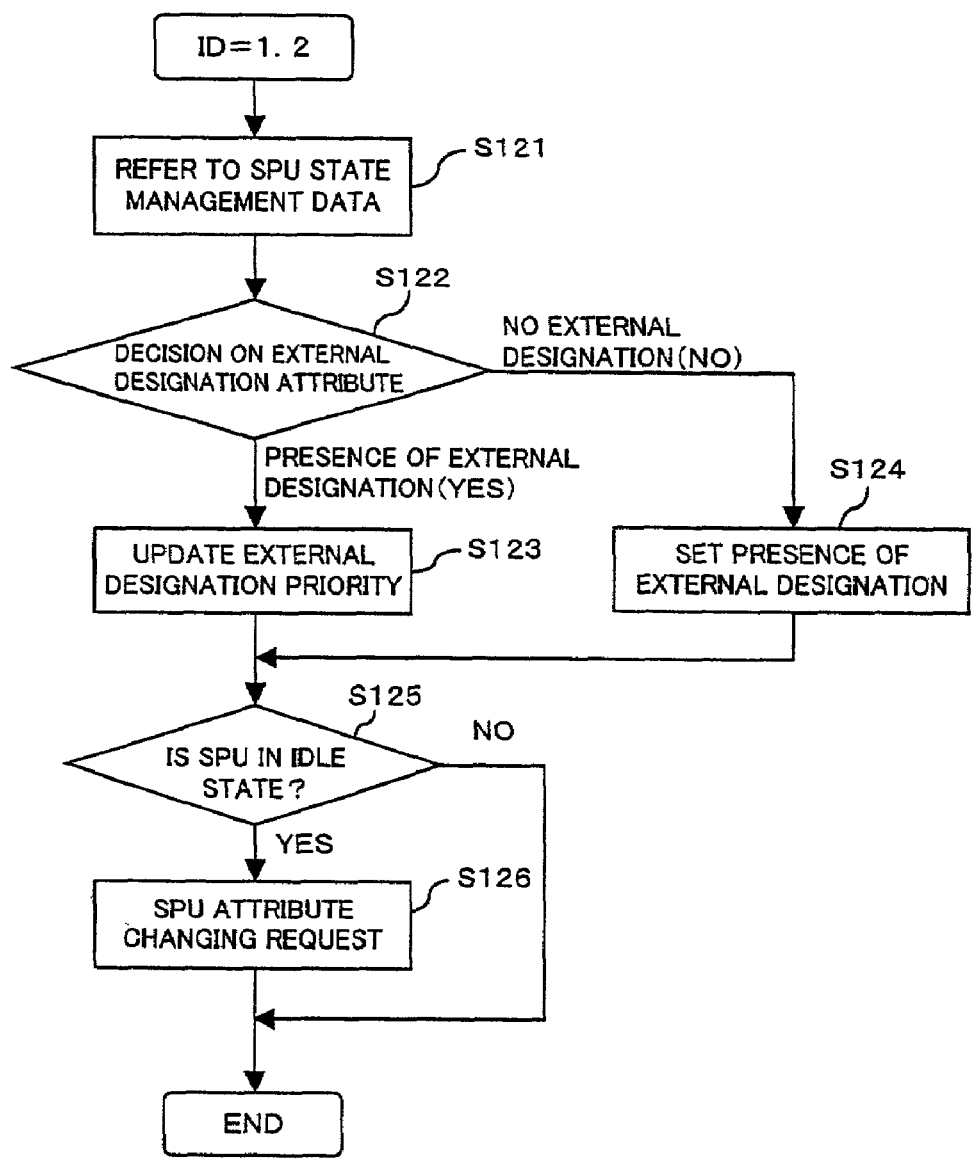
FIG. 16 is a flow chart useful for explaining an operation (non-time factor SPU attribute alteration procedure) of the SPU state managing section shown in FIGS. 2 and 3.

Concretely, in this case, since the contents of the processing request received from the maintenance console 6 indicate an SPU attribute changing instruction (ID=1.2) of a non-time factor, the SPU state management accepting section 45d performs a processing procedure (step A3) shown in FIG. 16 after the operational flow advances (branches) from a step S1 to a step S10 in FIG. 14 and further advances from a step S11 to a step S12.

That is, the SPU state management accepting section 45d first refers to the SPU state management data 451 (step S121), and confirms whether or not a value other than "0" (="no designation") is set in the external designation attribute data 451c (step S122).

If the confirmation result shows the setting of the value other than "0" (="no designation") (if the answer of the step S122 indicates "YES" decision), the external designation attribute data 451c is updated to a value corresponding to a service classification specified by the SPU attribute changing instruction, on the basis of the priority of the SPU attribute changing instruction. That is, when the priority of the SPU attribute changing instruction from the maintenance console 6 is higher, the updating of the external designation attribute data 451c takes place (step S123).

On the other hand, when "0" (="no designation") is set in the external designation attribute data 451c (when the answer of the step S122 indicates "NO" decision), the SPU state management accepting section 45d newly updates the external designation attribute data 451c to a value according to the specified service classification (step S124).

Following this, the SPU state management accepting section 45d refers to the SPU state data 451a for checking whether the SPU 44-i being the object of the attribute change is in a free condition or in a used condition (step S125). If being in the free condition (an attribute changeable condition), the SPU state management accepting section 45d makes a request for the attribute change of that SPU 44-i to the SPU service changing section 45e.

Whereupon, the SPU service changing section 45e gives an SPU attribute changing instruction to the SPU 44-i on that request (from "YES" route of the step S125 to a step S126: a step A4 in FIG. 9).

If the SPU 44-i forming the object of the attribute change is in the used condition, resulting from the fact of the updating of the external designation attribute data 451c, the attribute change is made during call disengagement processing using the SPU 44-i as will be described later with reference to FIGS. 19 and 20. In this case, the SPU service changing section 45e does not output the SPU attribute changing instruction to the SPU 44-i under use ("NO" route from the step S125).

Figure 10:
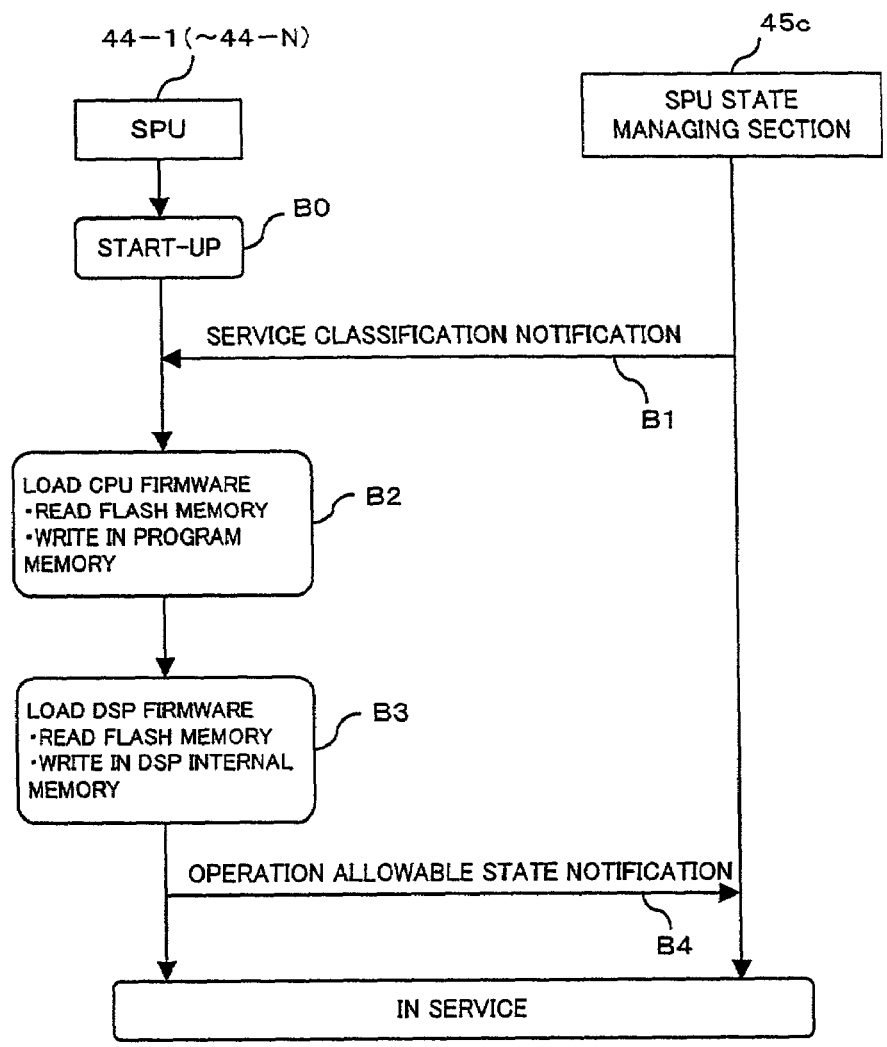
FIG. 10 is a sequence illustration useful for explaining an operation of the SPU in this embodiment.

Meanwhile, as FIG. 10 shows, in the SPU 44-i which has received the SPU attribute changing instruction from the SPU service changing section 45e (step B1) after the start-up (step B0) as mentioned above, the CPU 65 reads out a CPU firmware 662-k (k=1 to 7) handling a service classification (protocol) on the request from the CPU firmware area 662 of the flash memory 66 and writes it in the program memory as mentioned above with reference to FIG. 8, thereby loading the request service classification handling CPU firmware 662-k in the CPU 65 (step B2).

Likewise, the CPU 65 reads out the request service classification handling DSP firmware 663-k from the DSP firmware area 663 of the flash memory 66 and writes it in an internal memory of any one of the DSP modules 68-j, thereby accomplishing the loading of the DSP firmware (step B3; step A5 in FIG. 9). Upon the completion of the above-mentioned processing, the SPU 44-i enters an operation allowable condition, and the CPU 65 communicates this fact through the control system network 60a to the SPU state managing section 45c (step B4).

As a result, as FIG. 9 shows, the SPU state managing section 45c informs the maintenance console 6 of the SPU attribute change completion (step A6). With the above-mentioned processing being repeatedly conducted with respect to the SPUs 44-i forming the object of the attribute change, arbitrary SPUs 44-i can be set as the desired service classification handling SPUs 44-i to set/change the number of SPU allocations according to service classification.

Incidentally, although the above-described example is on the premise that the SPU attribute changing instruction from the maintenance console 6 is repeated by the number of SPUs forming the object of the attribute change, it is also appropriate that information on the SPU attribute change for a plurality of SPUs is set in the SPU attribute changing instruction so that the attributes of a plurality of SPUs 44-i are changed by one input of the SPU attribute changing instruction from the maintenance console 6.

Furthermore, a description will be given hereinbelow of an operation to be conducted in the case of setting the SPU attribute change on the basis of a time factor from the maintenance console 6.

Figure 11:
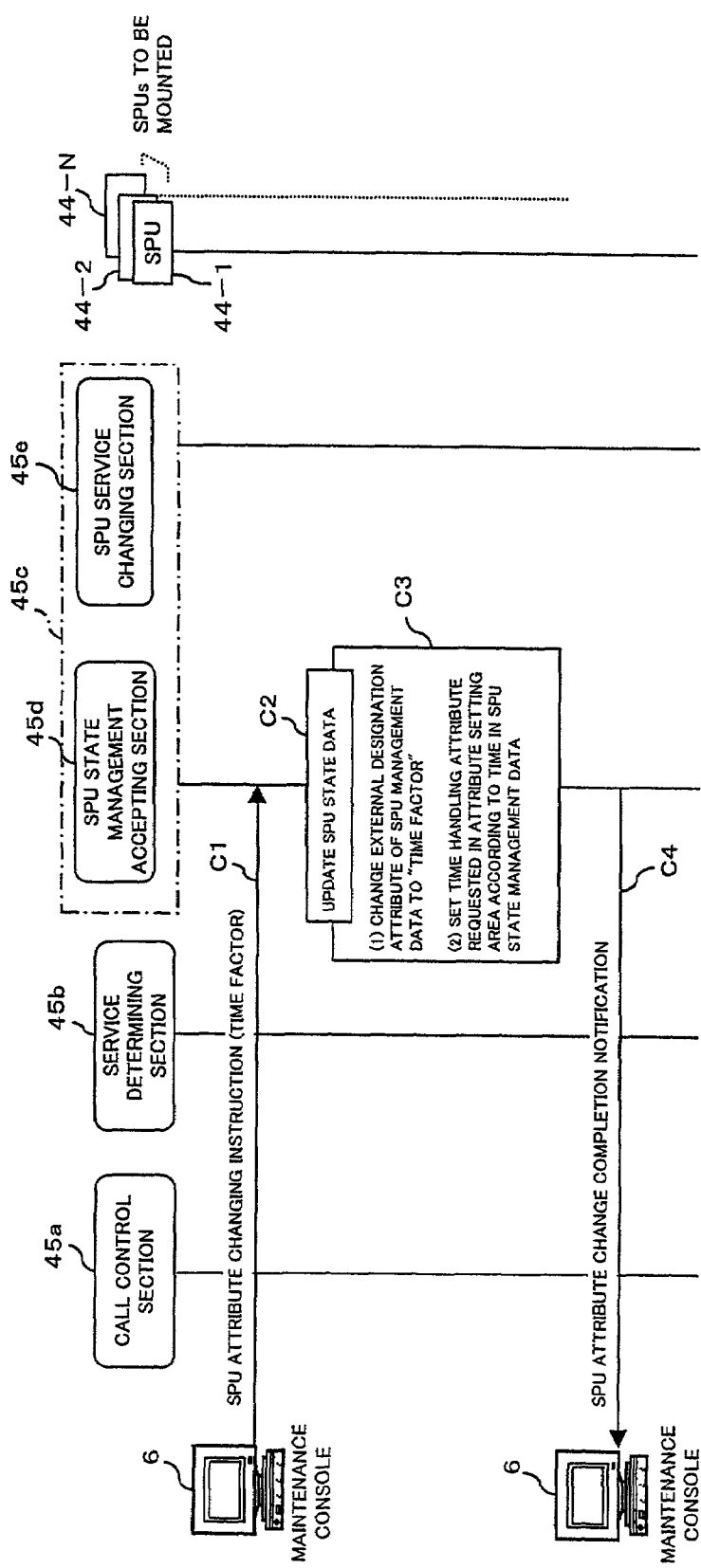
FIG. 11 is a sequence illustration useful for explaining an operation (SPU attribute alteration procedure based on a time factor) of the ATM switching apparatus according to this embodiment.

First, as FIG. 11 shows, when an SPU attribute changing instruction (ID=1.1) on a time factor for one SPU 44-i is inputted as a processing request from the maintenance console 6 (step C1), this processing request (SPU attribute changing instruction) is accepted by the SPU state managing section 45c (SPU state management accepting section 45d).

Accordingly, the SPU state management accepting section 45d updates the SPU state management data 451 for the corresponding SPU 44-i in accordance with the received SPU attribute changing instruction (step C2).

Figure 15:
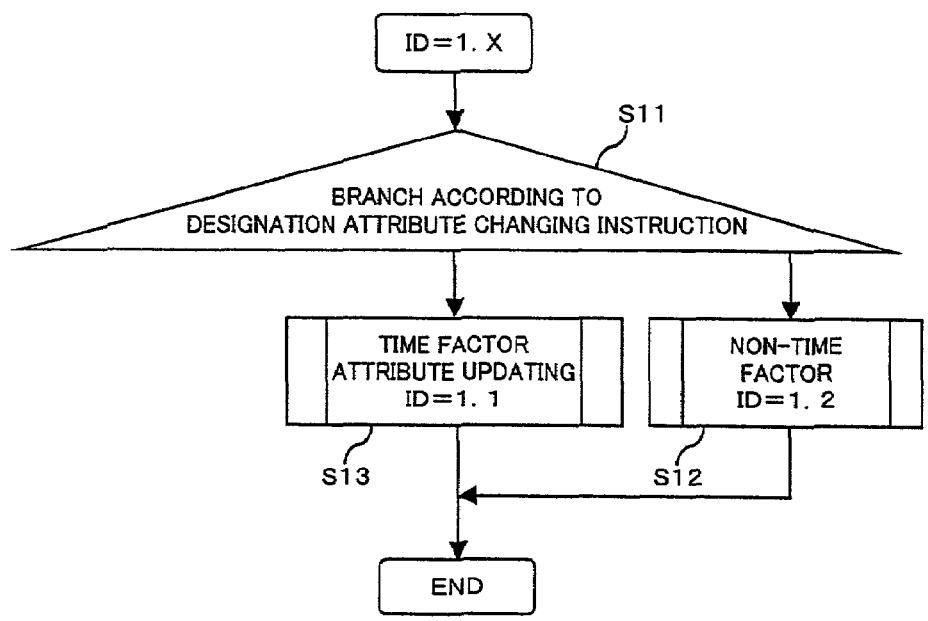
Figure 17:
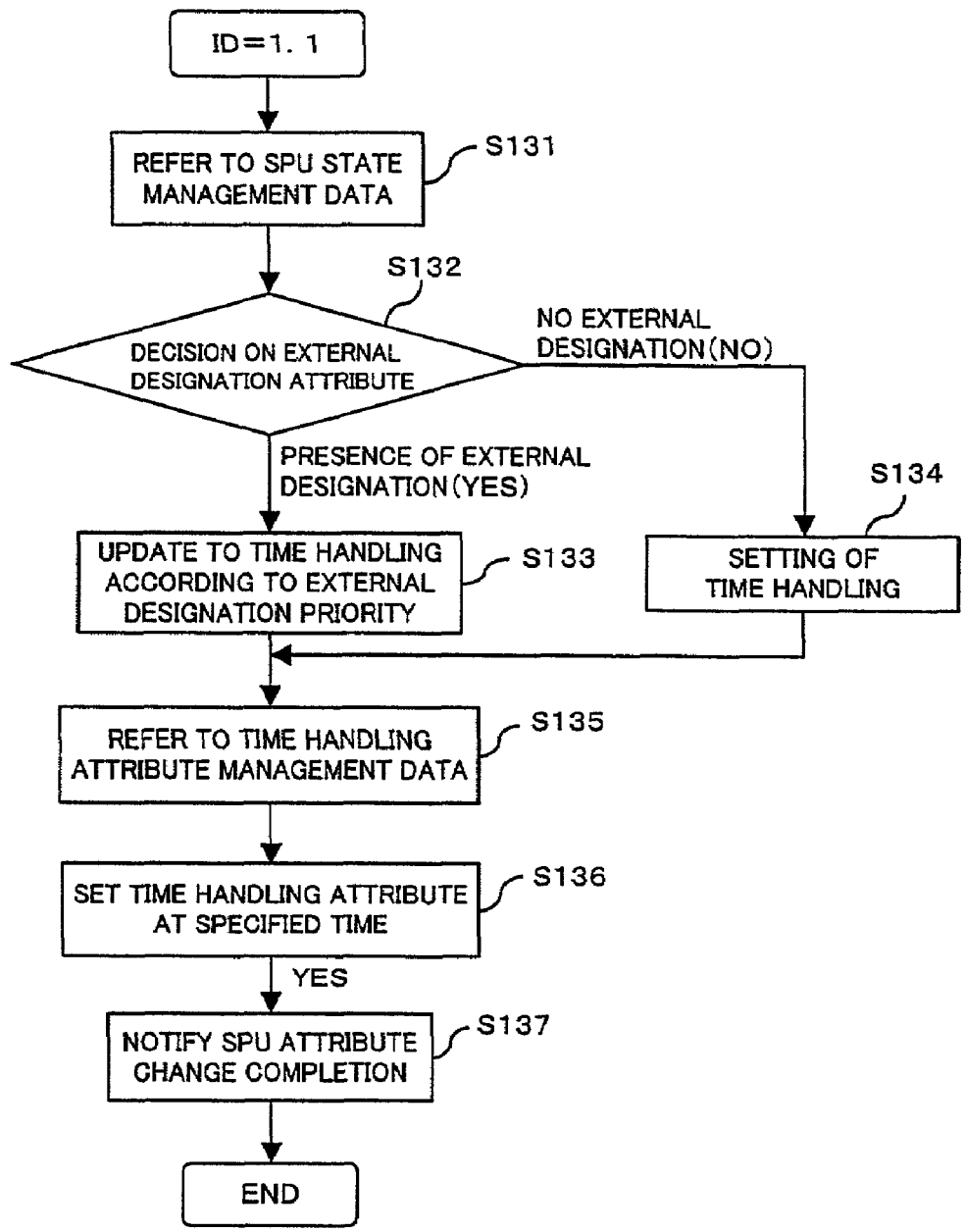
FIG. 17 is a flow chart useful for explaining an operation (time factor SPU attribute alteration procedure) shown in FIGS. 2 and 3.

Concretely, in this case, since the contents of the processing request received from the maintenance console 6 indicate the time factor SPU attribute changing instruction (ID=1.1), the SPU state management accepting section 45d conducts a processing procedure (step C3) shown in FIG. 17 after the operational flow takes its route from the step S1 to the step S10 in FIG. 14 and further proceeds from the step S11 to a step S13 in FIG. 15.

That is, the SPU state management accepting section 45d first sees the SPU state management data (step S131) for checking whether or not a value other than "0" (="no designation") is set in the external designation attribute data 451c (step S132).

If the check indicates the setting of the value other than "0" (="no designation"), the external designation attribute classification data 451b is set (updated) at "time handling" (="0") in accordance with the priority of the aforesaid SPU attribute changing instruction. That is, when the priority of the SPU attribute changing instruction inputted through the maintenance console 6 is higher, the external designation attribute data 451b is set (updated) (from "YES" route of step S132 to a step S133).

On the other hand, if the value "0" (="no designation") is set in the external designation attribute data 451c, the SPU state management accepting section 45d sets "time handling" (="0") in the external designation attribute classification data 451b (from "NO" route of the step S132 to a step S134).

Following this, the SPU state management accepting section 45d sees the time handling attribute management data 452 for the SPU 44-i forming the object of the attribute change (step S135) and sets the specified time data 452a and the time handling attribute data 452b (step S136), then informing the maintenance console 6 of the completion of the SPU 44-i attribute change (step S137; step C4 in FIG. 11).

The attribute change (setting) of the SPU 44-i on the time factor reaches completion through the above-mentioned operations, and thereafter, when the specified time comes, if the corresponding SPU 44-i is in a free condition, and if the current attribute (data 451d) and the external designation attribute (data 451c) do not agree with each other, an SPU attribute changing instruction is automatically given from the SPU attribute service changing section 45e to the corresponding SPU 44-i (if being in a free condition), thereby changing the attribute of the SPU 44-i. Thus, the service classification handling SPUs 44-i needed are previously securable at the specified time.

That is, in this case, there is no need for the SPU state managing section 45c to conduct the SPU attribute changing processing one by one according to call in the time zone in which an increase in traffic is predictable, which permits the speed-up of the call processing.

Incidentally, it is also acceptable that the aforesaid SPU attribute changing instruction on the time factor is repeated according to SPU 44-i forming the object of the attribute setting, or that the attribute change (setting) for a plurality of SPUs 44-i is accomplished by one SPU attribute changing (setting) instruction.

(2) Description of SPU Attribute Automatic Setting Processing During Operation (According to Call)

Secondly, a description will be given hereinbelow of an operation of the ATM switching apparatus 4 being in service operation.

Figure 12:
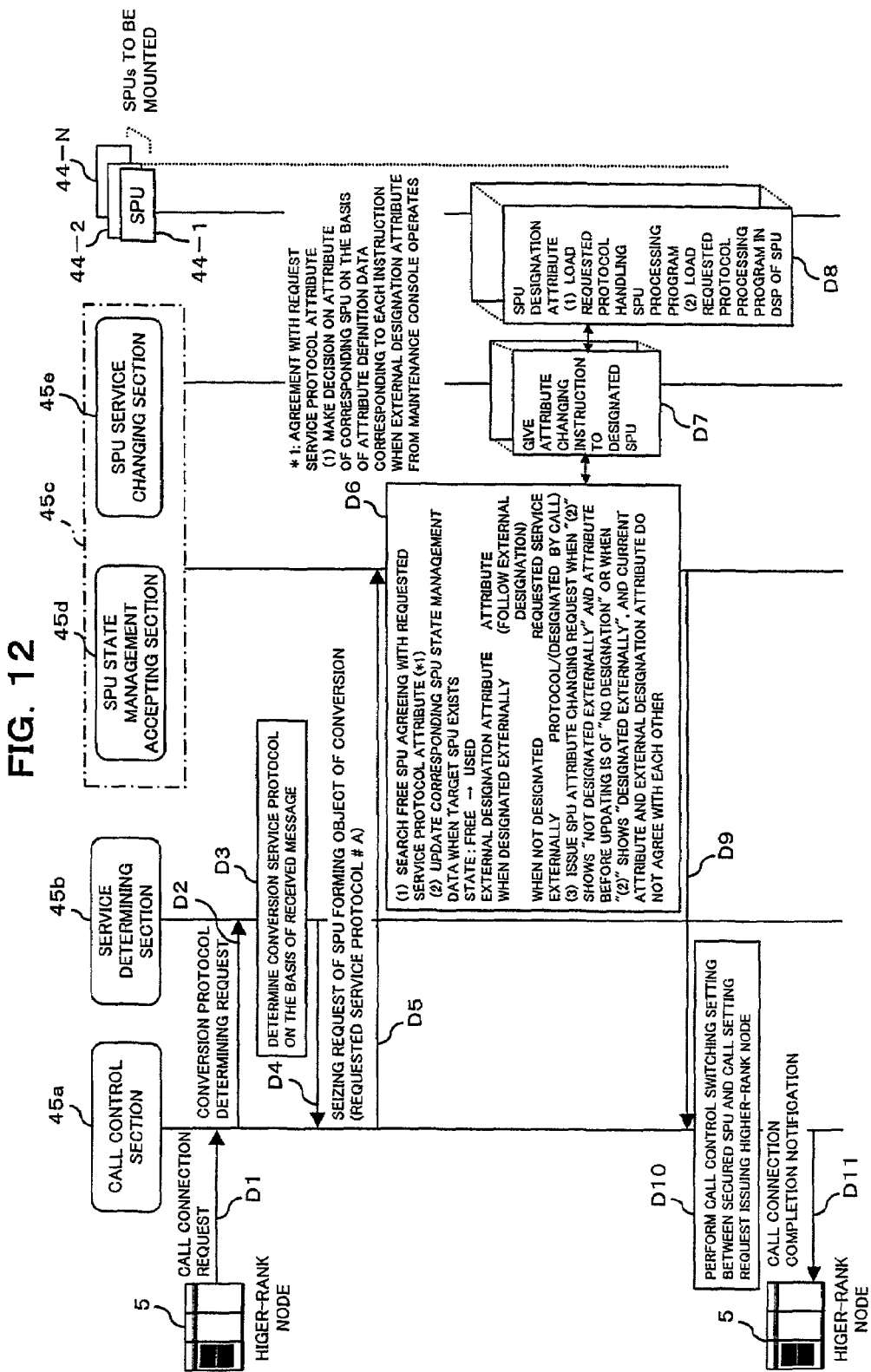
FIG. 12 is a sequence illustration useful for explaining an operation (SPU attribute automatic setting procedure according to call) of the ATM switching apparatus according to this embodiment.

First, as FIG. 12 shows, assuming that the main control unit 45 (call control section 45a) receives a service request (call connection request) on one call from the higher-rank node 5 (step D1), the call control section 45a outputs a determination request message for a protocol to be converted on that call, to the service determining section 45b (step D2). This message includes information for identifying the service classification.

Thus, the service determining section 45b discriminates the requested service classification (protocol) on the basis of the received message (step D3), and issues an SPU 44-i seizing request corresponding to that service classification to the call control section 45a (step D4). Upon receipt of this seizing request, the call control section 45a issues a similar SPU seizing request (ID=2) to the SPU state managing section 45c (SPU state management accepting section 45d) (step D5).

Figure 18:
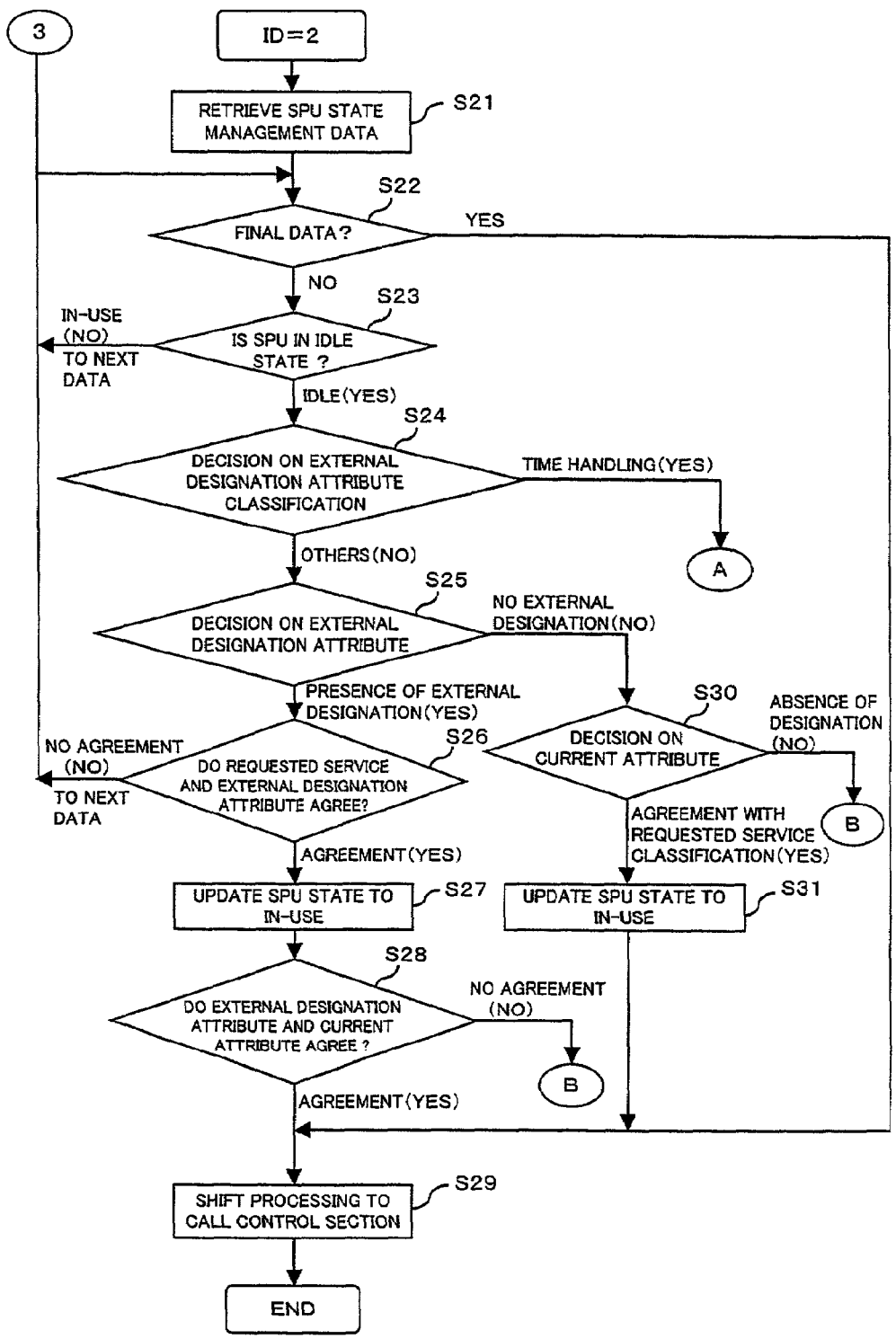
FIG. 18 is a flow chart useful for describing an operation (at SPU allocation request) of the SPU state managing section shown in FIGS. 2 and 3.

Since the received request forms the SPU seizing request (ID=2), the SPU state management accepting section 45d conducts a processing procedure (SPU retrieval processing) shown in FIG. 18 after the operational flow goes from the step S1 to a step S20 in FIG. 14 (step D6).

That is, the SPU state management accepting section 45d sees the SPU state management data 451 in order starting from the data for the SPU 44-i corresponding to the SPU logical number="1" for retrieving the requested service classification handling SPU 44-i. At this time, if the external designation attribute is on the setting through the maintenance console 6, the decision on the attribute of that SPU 44-i is made on the basis of the external designation attribute data 451c.

Concretely, the SPU state management accepting section 45d refers first to the SPU state management data 451 (step S21) for confirming whether or not the SPU state management data 451 referred to is the data corresponding to the last SPU logical number (step S22).

If the confirmation result indicates no last data, then the SPU state management accepting section 45d refers to the SPU state data 451a (see FIG. 5A) for confirming whether the SPU 44-i is in a free condition or in a used condition (from "NO" route of the step S22 to a step S23). If it is in the free condition, the SPU state management accepting section 45d further refers to the external designation attribute classification data 451b for confirming whether or not the "time handling" (="0") is set as the external designation attribute classification data 451b (from "YES" route of the step S23 to a step S24).

If the confirmation result indicates the setting other than the "time handling" (="0") as the external designation attribute classification data 451b, then the SPU state management accepting section 45d subsequently refers to the external designation attribute data 451c for checking wither or not the "completion of external designation" is already set as the external designation attribute data 451c (from "NO" route of the step S24 to a step S25).

If the check result shows the "completion of external designation", the SPU state management accepting section 45d further checks whether or not the requested service classification and the external designation attribute data 451c agree with each other (from "YES" route of the step S25 to a step S26). If they agree, the SPU state management accepting section 45d updates the SPU state data 451a to "in-use (used condition)" (="1") (from "YES" route of the step S26 to a step S27).

Following this, the SPU state management accepting section 45d refers to the external designation attribute data 451c and the current attribute data 451d for checking whether or not the external designation attribute and the current attribute agree with each other (step S28). If they agree, then this signifies that a free SPU 44-i in which the external designation attribute has already been designated and which corresponds to the requested service classification has been found out, and therefore, this SPU 44-i is secured as an SPU 44-i to be allocated in response to the fore said call connection request from the higher-rank node 5, and information describing this fact is communicated to the call control section 45a so that the subsequent processing is conducted in the call control section 45a (from "YES" route of the step S28 to a step S29; step D9 in FIG. 12).

Accordingly, as FIG. 12 shows, when receiving the aforesaid notification from the SPU state managing section 45c, the call control section 45a makes the switching setting (connection setting) between the SPU 44-i seized as mentioned above and the call connection request issuing higher-rank node 5 (step D10), and after the call connection, informs the higher-rank node 5 of the fact of the call connection completion (step D11).

On the other hand, if the answer of the aforesaid step S23 indicates that the SPU state is not in the idle condition ("NO" decision in the step S23) or if the answer of the aforesaid step S26 indicates that the requested service classification and the external designation attribute do not agree with each other ("NO" decision in the step S26), the processing starting at the aforesaid step S22 is conducted with respect to the SPU state management data 451 on the next SPU logical number.

Meanwhile, if the answer of the aforesaid step S25 indicates that the "no designation" (="0") is set in the external designation attribute data 451c ("NO" decision in the step S25), then the SPU state management accepting section 45d, as shown in FIG. 18, refers to the current attribute data 451d for checking whether or not the current attribute and the requested service classification agree with each other (step S30).

If the check result shows that the current attribute and the requested service classification agree with each other ("YES" decision in the step S30), then this signifies that an idle SPU 44-i whose current attribute corresponds to the requested service classification in the state of non-designation of the external designation attribute (no external designation) has been found out, the SPU state management accepting section 45d updates the corresponding SPU state data 451a to "in-use" (="1") (step S31), and secures that SPU 44-i as an SPU 44-i to be allocated on the aforesaid call connection request, and further notifies the call control section 45a of this fact so that the following processing is conducted in the call control section 45a (step S29).

In addition, also in this case, when receiving the foregoing notification from the SPU state managing section 45c, the call control section 45a performs the switching setting (connection setting) between the SPU 44-i secured as mentioned above and the call connection request issuing higher-rank node 5 (step D10), and after the call connection, informs the higher-rank node 5 of the completion of the call connection (step D11).

Figure 20:
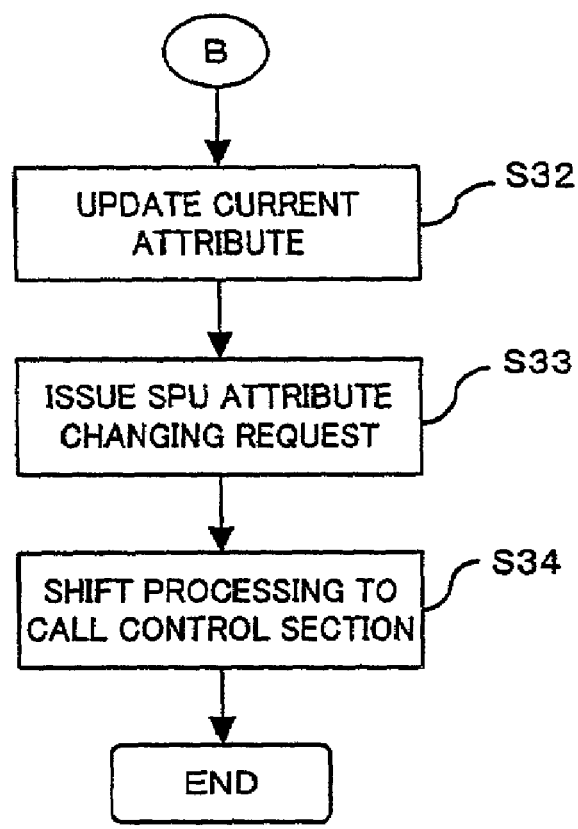
FIG. 20 is a flow chart useful for describing an operation (SPU attribute alteration procedure) of the SPU state managing section shown in FIGS. 2 and 3.
Figure 21:
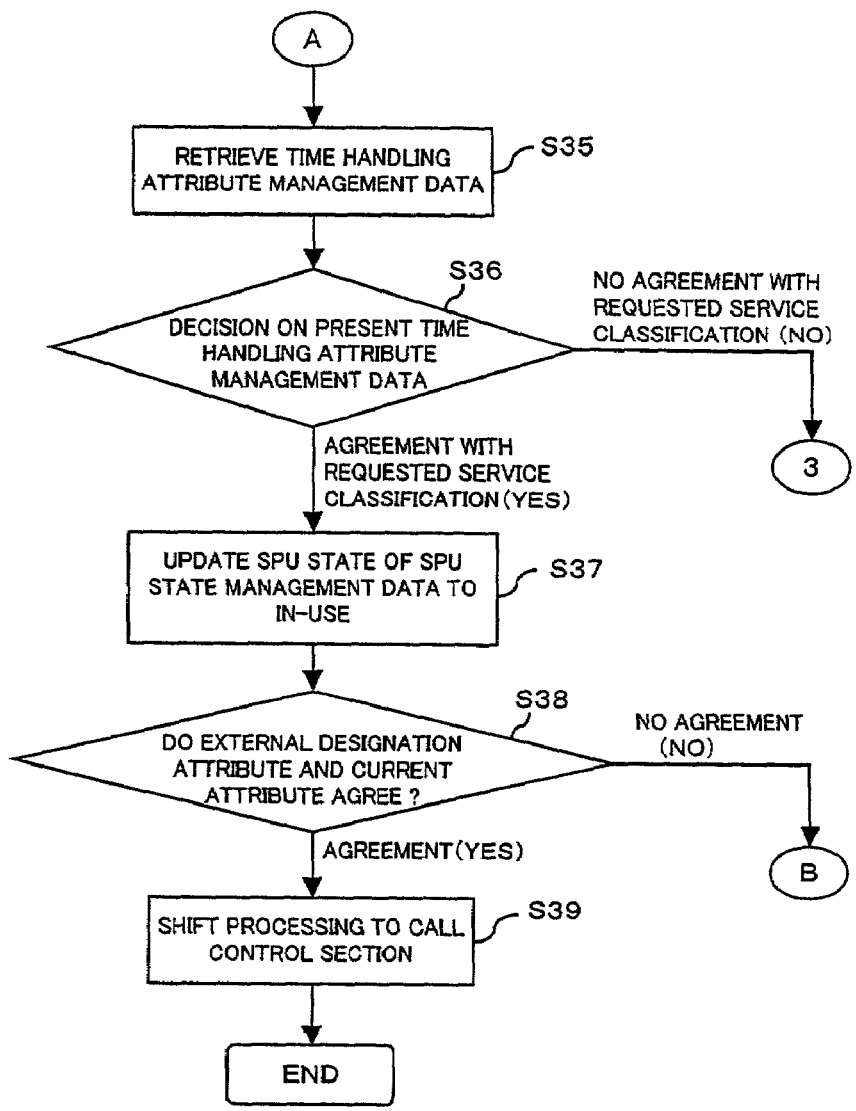
FIG. 21 is a flow chart useful for describing an operation (in the case of presence of time factor designation) of the SPU state managing section shown in FIGS. 2 and 3.

On the other hand, if the answer of the step S28 shows that the external designation attribute and current attribute of the SPU 44-i do not agree with each other ("NO" decision in the step S28), or if the answer of the step S30 shows that the requested service classification and the current attribute of the SPU 44-i do not agree with each other ("NO" decision in the step S30), then the SPU state management accepting section 45d, a shown in FIG. 20, updates the current attribute data 451d for solving the non-agreement (step S32), and issues a request for the change of the attribute of the corresponding SPU 44-i to the SPU attribute service changing section 45e.

As a result, the SPU attribute changing section 45e issues an attribute changing request (including required service classification) to the corresponding SPU 44-i (step S33; step D7 in FIG. 12), and hence, as mentioned above with reference to FIG. 10, the corresponding SPU 44-i reads out the CPU firmware 662-k and DSP firmware 663-k corresponding to the requested service classification from the flash memory 66 to load with them, thereby changing its own attribute to the required service classification handling attribute (protocol attribute) (step DB in FIG. 12).

In consequence, the SPU 44-*i* whose attribute has been changed as state above is seized as an SPU 44-*i* to be allocated on the aforesaid call connection request, and the following processing is conducted in the call control section 45*a* (step S34). That is, the call control section 45*a* performs the switching setting (connection setting) between the SPU 44-i seized as stated above and the call connection request issuing higher-rank node 5 (step D10 in FIG. 12), and after the call connection, notifies the higher-rank node 5 of the call connection completion (step D11 in FIG. 12).

Meanwhile, if the answer of the step S24 (see FIG. 18) shows that the "time handling" (="0") has been set in the external designation attribute classification data 451*b* ("YES" decision in the step S24), then the time factor attribute changing section 52 retrieves the corresponding time handling attribute management data 452 on the basis of the SPU logical number for the SPU state management data 451 being referred to so far (step S35).

Furthermore, if the time zone including the present time has been set in the time handling attribute management data 452 through the specified time data 452*a*, the time factor attribute changing section 52 sees the time handling attribute data 452*b* corresponding to that specified time data 452*a* for checking whether or not the required service classification and the time handling attribute agree with each other (step S36).

If the check result shows that the required service classification and the time handling attribute agree with each other ("YES" decision in the step S36), then this means that a free SPU 44-*i* which is equivalent to the required service classification in a state of the time handling attribute being already designated has been found out; therefore the time factor attribute changing section 52 updates the SPU state data 451*a* of the SPU state management data 451 for that SPU 44-*i* to "in-use" ("1") (step S37).

Subsequently, the time factor attribute changing section 52 makes a comparison between the external designation attribute data 451*c* and the current attribute data 451*d* to check whether or not the external designation attribute and current attribute of the SPU 44-*i* agree with each other (step S38). If they agree ("YES" decision in the step S38), the corresponding SPU 44-*i* is secured intact as an SPU 44-*i* to be allocated on the aforesaid call connection request, and the following processing is conducted in the call control section 45*a* (step S39; steps D9 to D11 in FIG. 12).

On the other hand, if the external designation attribute and current attribute of the SPU 44-*i* do not agree with each other ("NO" decision in the step S38), the current attribute is updated to agree with the external designation attribute as mentioned above with reference to FIG. 20, and the attribute of the corresponding SPU 44-*i* is changed from the current attribute to the external designation attribute by the SPU service changing section 45*e*, with the following processing being conducted in the call control section 45*a* (steps S32 to 34).

Meanwhile, if the answer of the aforesaid step S36 shows that the requested service classification and the time handling attribute do not agree with each other ("NO" decision in the step S36), the processing starting at the step S22, stated above with reference to FIG. 18, is implemented on the SPU state management data 451 corresponding to the next logical number.

As described above, according to call connection request from the higher-rank node 5, if SPUs 44-*i* having an attribute agreeing with an requested service classification exist already in a free condition, the SPUs 44-*i* are successively secured as allocation SPUs 44-*i*, and if no SPU 44-*i* having the attribute agreeing with the requested service classification exists in a free condition (if the requested service classification handling SPU 44-*i* is in short supply), the attribute of the SPU 44-*i* being in a free condition is changed to the requested service classification handling attribute and then secured as the allocation SPU 44-*i*.

For example, as FIG. 22A shows, in a case in which the number of SPUs 44-*i* to be allocated, which handles each of the service classifications of "voice", "ISDN", "packet", "PIAFS", "FAX", "modem" and "PPP", is set at a minimum (one in FIG. 22A) in the initial setting, the attributes of the remaining SPUs 44-*i* (SPUs 44-*i* which are not designated from the external: SPU logical numbers=8 to 30) are properly changed during the operation (every call) as mentioned above, thus making up for the lack of the service classification handling SPUs 44-*i*.

In addition, for example, as FIG. 22B shows, also in a case in which the numbers of SPUs 44-*i* to be allocated, which are made to handle the respective service classifications, are set, as the initial values, at a ratio meeting the predictable traffics on the service classifications (in FIG. 22B, five for "voice", five for "ISDN", five for "packet", two for "PIAFS", two for "FAX", two for "modem", and two for "PPP"), when the attributes of the SPUs 44-*i* (SPU logical numbers=24 to 30) which are not designated from the external or the attributes of the SPUs 44-*i* which are set for other service classifications but which are in a free condition are changed properly during the operation, thus making up for the lack of the service classification handling SPUs 44-*i*.

Incidentally, in the examples shown in FIGS. 22A and 22B, the number of SPUs=32, that is, N=32. In addition, in FIGS. 22A and 22B, the two SPUs 44-*i* (see screened portions) corresponding to the SPU logical number=31, 32 are mounted as spare, with their configuration being the same as that of the other SPUs 44-*i*. Accordingly, even if any service classification handling SPU 44-*i* falls into an unserviceable condition, for example, due to occurrence of a trouble, they can substitute for that SPU 44-*i*.

Furthermore, a description will be given hereinbelow of the processing to be conducted for when the aforesaid call connection is cut off (call release from the connection).

Figure 13:
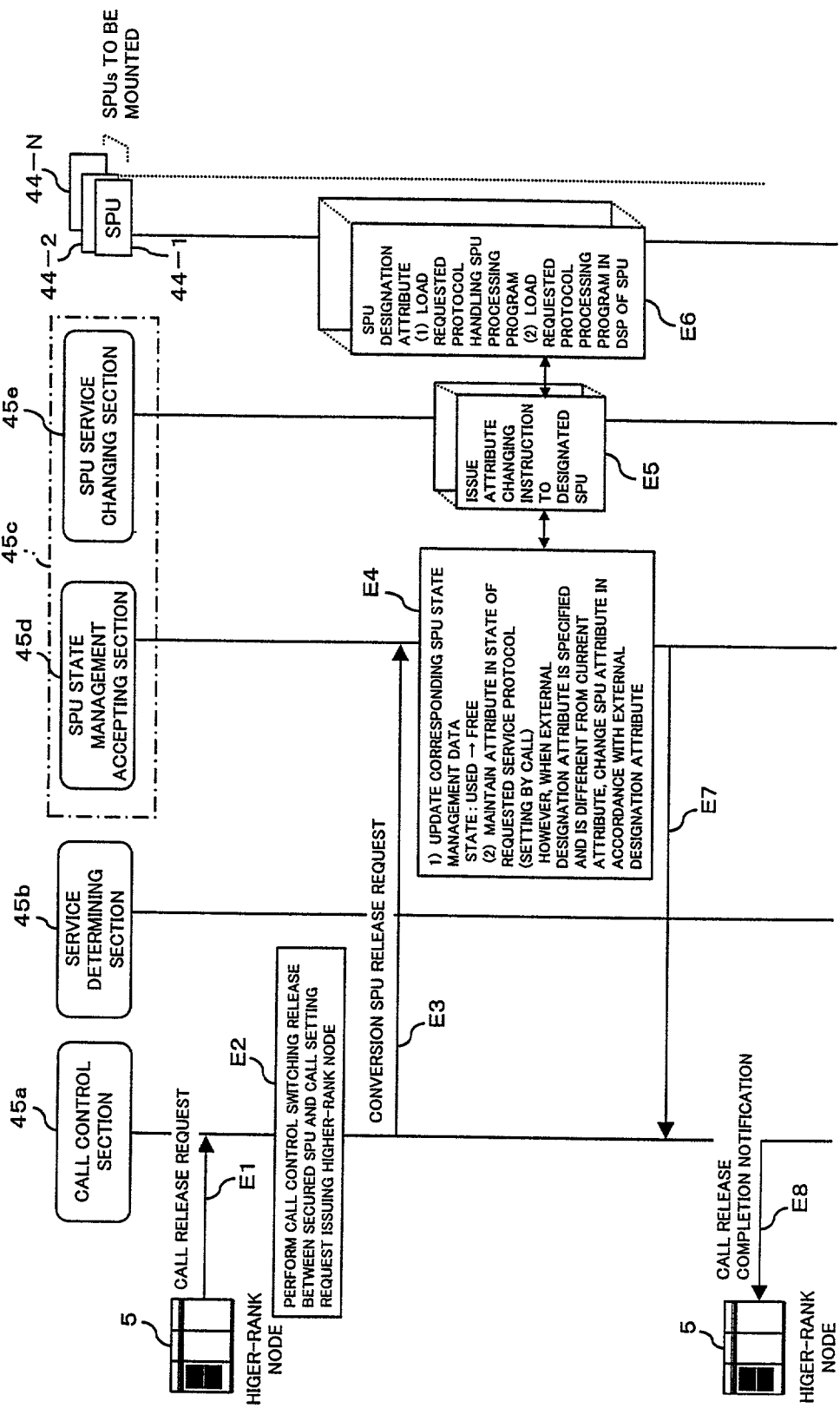
FIG. 13 is a sequence illustration useful for explaining an operation (assigned SPU releasing procedure) of the ATM switching apparatus according to this embodiment.

First, as FIG. 13 shows, when receiving a call release request transmitted from the higher-rank node 5 (step E1), the call control section 45 makes a release from the connection setting between the corresponding SPU 44-*i* and the call connection request issuing higher-rank node 5 (step E2), and outputs a release request (SPU release request: ID=3) of the resource (SPU 44-*i*) secured for the release call to the SPU state managing section 45*c* (SPU state management accepting section 45*d*) (step E3).

Figure 19:
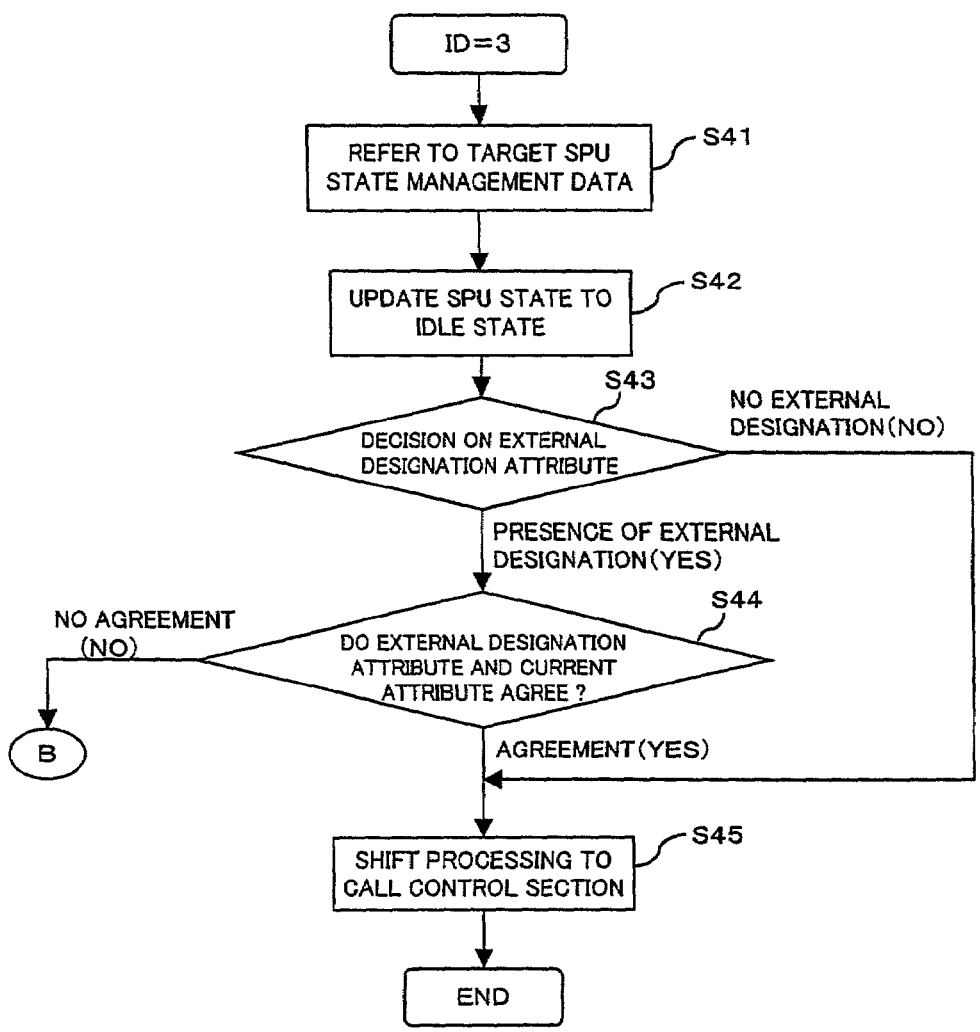
FIG. 19 is a flow chart useful for describing an operation (at SPU release request) of the SPU state managing section shown in FIGS. 2 and 3.

In response to this request, the SPU state management accepting section 45*d* takes its route from the step S1 to a step S40 in FIG. 14 because the request received is the SPU release request (ID=3), thus implementing a processing procedure (updating processing of the corresponding SPU state management data 451) shown in FIG. 19 (step E4).

That is, the SPU state management accepting section 45*d* sees the relevant SPU state management data 451 (step S41) and updates the SPU state data 451*a* to "idle" (="0") (step S42). Thereafter, the SPU state management accepting section 45*d* checks whether or not "designated" (value other than "0") is set in the external designation attribute data 451*c* of the same SPU state management data 451 (step S43).

If the check result shows "no designation" (="0"), the SPU state management accepting section 45*d* informs the call control section 45*a* of the fact of completion of the SPU release processing (step E7 in FIG. 13), with the following processing being conducted in the call control section 45a (from "NO" route of the step S43 to a step S45). Whereupon, the call control section 45a notifies the call release request issuing higher-rank node 5 of the completion of the call release (step E8 in FIG. 13), and the call release processing reaches completion.

On the other hand, in a case in which a value other than "0" is set in the external designation attribute data 451c and the answer of the aforesaid step S43 shows the "specified" external designation attribute, the SPU state management accepting section 45d further refers to the external designation attribute data 451c and the current data 451d in the same SPU state management data 451 for checking whether or not the external designation attribute and the current attribute coincide with each other (from "YES" route of the step S43 to a step S44).

If the check result shows the coincidence between the external designation attribute and the current attribute, as with the case of no designation of the external designation attribute ("NO" decision in the step S43), the call control section 45a subsequently take change of the processing ("YES" route of the step S44 to the step S45), and outputs a call release completion notification to the higher-rank node 5 (steps E7 and E8 in FIG. 13).

On the other hand, if the external designation attribute and the current attribute do not coincide with each other ("NO" decision in the step S44), the SPU state management accepting section 45d conducts the processing of the steps S32 to S34 mentioned above with FIG. 20 to update the current attribute for setting up the coincidence with the external designation attribute, and after the SPU service changing section 45e changes the attribute of the corresponding SPU 44-i to the external designation attribute (steps E5 and E6 in FIG. 13), the call control section 45a takes over the processing. That is, the call control section 45a notifies the call release request issuing higher-rank node 5 of the completion of the call release, and then the call release processing reaches completion (steps E7 and E8 in FIG. 13).

In this way, whenever a call release request takes place from the higher-rank node 5, the relevant SPU 44-i is released from the securing and, in the case of the presence of the designation of an external designation attribute (default attribute), the attribute thereof is automatically changed to an attribute corresponding thereto, while in the case of no designation for the external designation attribute, the attribute at the securing is taken intact.

As described above, with the ATM switching apparatus (MPE) 4 according to this embodiment, the SPU state managing section 45c executes control to load a program handling a service classification, the higher-rank node 5 issues a request for, that is, a user (subscriber) designates, in an SPU 44-i in which a plurality of programs (CPU firmware and DSP firmware) corresponding to a plurality of types of service classifications are placed in one package, which enables flexible change/seizing of an arbitrary SPU 44-i for handling a requested service classification according to call.

Accordingly, as compared with the case in which a dedicated SPU is mounted according to service classification like the conventional art, that is, in comparing with the case in which the number of SPU allocations is fixed according to service classification, the number of needed SPUs 44-i to be mounted is significantly reducible and the size reduction of the ATM switching apparatus 4 is considerably feasible.

In addition, since there is no need for the manufacturer of the ATM switching apparatus 4 to produce a dedicated SPU for each service classification, which enables shift from many-type production and maintenance to few-type production and maintenance, thus reducing the cost and improving maintenance quality.

Still additionally, even if the traffic on one service classification increases to cause the SPUs 44-i for handling this service classification to be in short supply, it is possible to use free SPUs 44-i for making up for the lack of the service handling SPUs 44-i. That is, since the overall traffic is acceptable by all the mounted SPUs 44-i without depending on the service classification, as compared with a case in which a dedicated SPU is mounted according to service classification, the allowable traffic quantity can increase and the probability of call loss is suppressible to an extremely low value. In consequence, the connectivity is improvable significantly to users.

Moreover, the calculation of the number of SPUs to be mounted at the production of the ATM switching apparatus 4 can depend only upon an estimate of traffic quantity, which can eliminate the need for the ordinary analysis of a traffic quantity on a request from a peripheral higher-rank node according to service classification handling SPU. Still moreover, even if the system is put in operation, this eliminates the need for the maintenance according to service, and requires simply coping with the excess and deficiency of the SPUs 44-i at the peak traffic.

Furthermore, since the attribute change of the SPUs 44-i can take place in response to an SPU attribute changing instruction based on a time factor so that these SPUs 44-i act, at the specified time, as the SPUs 44-i which can handle a specified service classification, the SPUs 44-i for handling specific service classification are previously securable at every time.

Accordingly, even in a special case, such as sale by subscription through telephone or internet at, for example, the start of business or the end of a lunch break in ordinary enterprise, in which the occurrence of a large quantity of traffic at specific dates and hours is predictable, it is possible to suppress the probability of call loss to a minimum while considerably cutting the number of SPUs to be mounted, as compared with the conventional art.

(3) Others

Although the above-described embodiment relates to an example in which a multimedia signal processing apparatus is constructed as an ATM switching apparatus, the present invention is not limited to this, but the invention can be constructed as other types of switching apparatuses or call processing systems, which can also provide the same effects as those of the above-described embodiment.

In addition, although in the above-described embodiment various setting such as an SPU attribute changing instruction is made through the maintenance console 6 with respect to the ATM switching apparatus 4, they can naturally be made through other arbitrary control units.

Still additionally, although in the above-described embodiment the SPU 44-i employs an arrangement to selectively load a plurality of types of programs (firmware) corresponding to a plurality of types of service classifications in the CPU 65 and the DSP module 68-j for realizing the SPU 44-i which handles the plurality of types of service classifications, there is no need to always employ this arrangement, provided that the SPU 44-i for handling a plurality of types of service classifications is realizable.

For example, it is also possible to employ an arrangement to simply select, according to a requested service classification, any one of a plurality of service classification handling signal processing means, such as DSP modules for a plurality of types of service classifications, which are prepared in advance. However, the employment of the arrangement according to the above-described embodiment is more advantageous because of being capable of decreasing the number of DSP modules to be mounted than the number of service classifications as mentioned above.

Moreover, although, for convenience of description only, the above-described example premises that one SPU 44-*i* is made to process calls for one channel, if one SPU 44-*i* has capability to process calls for a plurality of channels, the following algorithm is additionally provided for coping with this situation.

That is, in retrieving an SPU 44-*i* with an attribute corresponding to a service classification requested by the higher-rank node 5, the first retrieval is made to search an SPU 44-*i* corresponding to the requested service classification and having a call processing ability to spare. If an SPU 44-*i* satisfying these conditions exists, that SPU 44-*i* is seized as an SPU 44-*i* to be allocated on the service request. On the other hand, if the condition satisfying SPU 44-*i* is absent, the attribute of another SPU 44-*i* being in a "free condition" (to which a call is not allocated) is changed and the another SPU 44-*i* is secured as an SPU 44-*i* to be allocated on the service request.

With such an algorithm, a call is allocated to an SPU 44-*i* corresponding to a requested service classification and having a processing ability to spare according to service request from the higher-rank node 5, and if the SPU 44-*i* corresponding to the requested service classification and having a processing ability to spare then becomes nonexistent, a free SPU 44-*i* handling the requested service classification is newly secured and a call is allocated thereto.

Furthermore, it should be understood that the present invention is not limited to the above-described embodiment, and that it is intended to cover all changes and modifications of the embodiment of the invention herein which do not constitute departures from the spirit and scope of the invention.

What is claimed is:

1. A multimedia signal processing apparatus comprising:
a plurality of communication service units each having a plurality of types of signal processing modes corresponding to a plurality of types of communication service classifications;
communication service classification identifying means for identifying, on the basis of signal processing request information on one call communicated, a communication service classification for said call; and
mode control means for controlling a signal processing mode of said communication service unit which has been set the other signal processing mode to a mode suitable for the communication service classification identified in said communication service classification identifying means based on the number of call for a communication service classification identified by said communication service classification identifying means.

2. A multimedia signal processing apparatus according to claim 1, wherein said mode control means comprises external indication type mode control section for controlling said signal processing mode of said communication service unit in accordance with a mode setting instruction from an external device.

3. A multimedia signal processing apparatus according to claim 1, wherein said mode control means includes:

history information managing section for managing history information on mode control implemented in the past; and
prediction type mode control section for predictively controlling said signal processing mode of said communication service unit on the basis of said history information.

4. A multimedia signal processing apparatus according to claim 3, wherein said prediction type mode control section includes time factor mode controller for controlling said mode of said communication service unit to a mode corresponding to mode setting information at a specified time on the basis of time information based on said history information and said mode setting information.

5. A multimedia signal processing apparatus according to claim 1, wherein said communication service unit includes:
storage means for storing a plurality of types of communication service control programs corresponding to said plurality of types of communication service classifications; and
mode selection control means for controlling its own signal processing mode by loading selectively with a corresponding communication service control program from said storage means in accordance with a signal processing mode control indication from said mode control means.

6. A multimedia signal processing apparatus according to claim 2, wherein said communication service unit includes:
storage means for storing a plurality of types of communication service control programs corresponding to said plurality of types of communication service classifications; and
mode selection control means for controlling its own signal processing mode by loading selectively with a corresponding communication service control program from said storage means in accordance with a signal processing mode control indication from said mode control means.

7. A multimedia signal processing apparatus according to claim 3, wherein said communication service unit includes:
storage means for storing a plurality of types of communication service control programs corresponding to said plurality of types of communication service classifications; and
mode selection control means for controlling its own signal processing mode by loading selectively with a corresponding communication service control program from said storage means in accordance with a signal processing mode control indication from said mode control means.

8. A multimedia signal processing apparatus according to claim 4, wherein said communication service unit includes:
storage means for storing a plurality of types of communication service control programs corresponding to said plurality of types of communication service classifications; and
mode selection control means for controlling its own signal processing mode by loading selectively with a corresponding communication service control program from said storage means in accordance with a signal processing mode control indication from said mode control means.

9. A multimedia signal processing apparatus comprising:
a plurality of communication service units each having a plurality of types of signal processing modes corresponding to a plurality of types of communication service classifications; and control means for controlling the number of assigning of said communication service units, based on the number of call for a specific communication service classification, by changing signal processing mode of one or more of communication service units to a mode suitable for said communication service classification.

* * * * *